(12) United States Patent
Imai et al.

(10) Patent No.: US 11,258,510 B2
(45) Date of Patent: Feb. 22, 2022

(54) TUNABLE OPTICAL FILTER CONTROL APPARATUS AND TUNABLE OPTICAL FILTER CONTROL METHOD

(71) Applicant: Nippon Telegraph and Telephone Corporation, Tokyo (JP)

(72) Inventors: Takeshi Imai, Musashino (JP); Takuya Kanai, Musashino (JP); Kota Asaka, Musashino (JP)

(73) Assignee: Nippon Telegraph and Telephone Corporation, Tokyo (JP)

(*) Notice: Subject to any disclaimer, the term of this patent is extended or adjusted under 35 U.S.C. 154(b) by 0 days.

(21) Appl. No.: 17/057,024

(22) PCT Filed: May 9, 2019

(86) PCT No.: PCT/JP2019/018638
§ 371 (c)(1),
(2) Date: Nov. 19, 2020

(87) PCT Pub. No.: WO2019/225345
PCT Pub. Date: Nov. 28, 2019

(65) Prior Publication Data
US 2021/0111791 A1    Apr. 15, 2021

(30) Foreign Application Priority Data

May 24, 2018 (JP) .............................. JP2018-100064

(51) Int. Cl.
*H04J 14/02* (2006.01)
*H04B 10/079* (2013.01)
(Continued)

(52) U.S. Cl.
CPC ....... *H04B 10/0791* (2013.01); *G02B 6/4215* (2013.01); *H04B 10/07957* (2013.01);
(Continued)

(58) Field of Classification Search
CPC .......... H04B 10/0791; H04B 10/07957; H04B 10/572; H04B 10/675; H04B 10/0795;
(Continued)

(56) References Cited

U.S. PATENT DOCUMENTS

2002/0024736 A1* 2/2002 Itou .......................... G02B 5/20
                                                                                    359/578

FOREIGN PATENT DOCUMENTS

JP            9-326766        12/1997
JP         2005-172975         6/2005
(Continued)

OTHER PUBLICATIONS

KR1020150024286—Wavelength Adjusting Method of Tunable Optical Receiver in Time and Wavelength Division Multiplexing-Passive Optical Network. Machine translation (Year: 2015).*
(Continued)

*Primary Examiner* — Hibret A Woldekidan
(74) *Attorney, Agent, or Firm* — Fish & Richardson P.C.

(57) ABSTRACT

A wavelength-tunable optical filter control apparatus in an optical access system that uses wavelength-multiplexed optical signal of a plurality of wavelength channels includes a wavelength-tunable optical filter configured to pass an optical signal of a specific wavelength channel among the plurality of wavelength channels; a light receiving element configured to convert the optical signal that has passed through the wavelength-tunable optical filter into an electrical signal; a signal quality determining unit configured to determine a quality of the electrical signal; and a wavelength-tunable optical filter control unit configured to acquire a light intensity of the electrical signal and control a wavelength of the wavelength-tunable optical filter based on the acquired light intensity and a determination result of the quality of the electrical signal.

10 Claims, 12 Drawing Sheets

(51) Int. Cl.
*G02B 6/42* (2006.01)
*H04Q 11/00* (2006.01)

(52) U.S. Cl.
CPC .......... *H04J 14/02* (2013.01); *H04Q 11/0005* (2013.01); *H04Q 2011/0009* (2013.01); *H04Q 2011/0016* (2013.01); *H04Q 2011/0018* (2013.01); *H04Q 2011/0039* (2013.01)

(58) Field of Classification Search
CPC .......................... H04B 10/564; H04B 10/0799; H04B 10/671; G02B 6/4215; G02B 5/20; H04J 14/02; H04J 14/0221; H04Q 11/0005; H04Q 2011/0009; H04Q 2011/0016; H04Q 2011/0018; H04Q 2011/0039; H01S 5/141
USPC .............. 398/13, 14, 17, 85, 213, 25, 95, 96
See application file for complete search history.

(56) References Cited

FOREIGN PATENT DOCUMENTS

| KR | 10-2015-0024286 | | 3/2015 | |
|----|----|----|----|----|
| KR | 1020150024286 | * | 6/2021 | ............. H04B 10/66 |

OTHER PUBLICATIONS

[No Author Listed], "40-Gigabit-capable passive optical networks (NG-PON2): General requirements," International Telecommunication Union, ITU-T Recommendation G.989.1, Mar. 2013, 24 pages.

[No Author Listed], "General Overview of NGN," International Telecommunication Union, ITU-T Recommendation Y.2001, Dec. 2004, 17 pages.

PCT International Search Report in International Appln. No. PCT/JP2019/018638, dated Jul. 16, 2019, 4 pages.

* cited by examiner

| INDICATOR AFTER END OF WAVELENGTH CONTROL (OI, MO, CS) | RESULT OF WAVELENGTH CONTROL | EXAMPLE OF ASSUMABLE FAILURE | EXAMPLE OF TROUBLESHOOTING METHOD |
|---|---|---|---|
| (1, 1, 0) | RECOVERY TO CORRESPONDING CHANNEL. | FILTER WAVELENGTH DISCREPANCY | (RECOVERED) |
| (1, 1, 1) | SWITCH TO OTHER CHANNEL AND RESUME OPERATION | DETERIORATION IN INTENSITY OF OPTICAL SIGNAL OR QUALITY CAUSED BY FAILURE OF PORTION THROUGH WHICH ONLY OPTICAL SIGNAL OF CORRESPONDING WAVELENGTH CHANNEL PASSES, THAT IS,<br>• FAILURE OF TRANSMISSION UNIT OF OLT USING CORRESPONDING WAVELENGTH CHANNEL.<br>• FAILURE OF SECTION BETWEEN SECONDARY MULTIPLEXER/DEMULTIPLEXER AND CORRESPONDING OLT, OR THE LIKE. | DISPATCH MAINTENANCE PERSONNEL OF TELECOMMUNICATIONS CARRIER BASE TO INVESTIGATE, REPAIR, AND REPLACE CORRESPONDING OLT, WIRING TO SECONDARY MULTIPLEXER/DEMULTIPLEXER, AND SECONDARY MULTIPLEXER/DEMULTIPLEXER. MAINTENANCE PERSONNEL IS DISPATCHED TO LOCATION AT WHICH ONU IS INSTALLED TO REPAIR AND REPLACE ONU. |
| (1, 0, 0) | ALTHOUGH LIGHT INTENSITY IS SATISFIED, OPERATION IS NOT RESUMED DUE TO POOR SIGNAL QUALITY. NO SWITCHING TO ANOTHER CHANNEL. | WAVELENGTH CONTROL AT ONU FAILS. OTHER FAILURES ARE NOT ASSUMED DUE TO LACK OF INFORMATION. | MAINTENANCE PERSONNEL IS DISPATCHED TO LOCATION AT WHICH ONU IS INSTALLED TO REPAIR AND REPLACE ONU AND CHECK OPERATION OF WAVELENGTH CONTROL. |
| (1, 0, 1) | ALTHOUGH LIGHT INTENSITY IS SATISFIED, RECOVERY IS NOT POSSIBLE DUE TO ABNORMALITY IN SIGNAL QUALITY THROUGHOUT ALL CHANNELS. | FAILURE INVOLVING SIGNAL QUALITY TO DEGREE THAT NO SIGNIFICANT REDUCTION IN OPTICAL SIGNAL INTENSITY IS CAUSED AT PORTION THROUGH WHICH OPTICAL SIGNAL FROM ALL OLTS PASSES, THAT IS,<br>• CONNECTION FAILURE, FINE DAMAGE, AND THE LIKE AT SECONDARY MULTIPLEXER/DEMULTIPLEXER, TEMPORARY MULTIPLEXER/DEMULTIPLEXER, WIRING BETWEEN THE ELEMENTS, OPTICAL ACCESS LINES, SPLITTER, AND SIGNAL LIGHT INPUT UNIT OF ONU.<br>• FAILURE OF ELECTRICAL SIGNAL PROCESSING UNIT OF ONU, AND THE LIKE. | INVESTIGATE LINE CHARACTERISTICS SUCH AS OPTICAL SIGNAL REFLECTIVITY AND OPTICAL SIGNAL LOSS IN SECTION FROM SECONDARY MULTIPLEXER/DEMULTIPLEXER TO ONU, AND PERFORM REPAIR AND REPLACEMENT AS NECESSARY. MAINTENANCE PERSONNEL IS DISPATCHED TO LOCATION AT WHICH ONU IS INSTALLED TO REPAIR AND REPLACE ONU. |
| (0, *, 1) | INSUFFICIENT LIGHT INTENSITY. NO RECOVERY DESPITE SWITCHING TO ANOTHER CHANNEL. | FAILURE THAT LEADS TO SIGNIFICANT REDUCTION IN SIGNAL LIGHT INTENSITY AT PORTION THROUGH WHICH OPTICAL SIGNAL FROM ALL OLTS PASSES, THAT IS,<br>• FAILURE OF ALL OLTS;<br>• DAMAGE TO PRIMARY MULTIPLEXER/DEMULTIPLEXER;<br>• BREAKAGE OF SECTION FROM OPTICAL ACCESS LINE TO ONU; AND<br>• FAILURE OF RECEIVING UNIT OF ONU. | SEARCH BROKEN SITE IN SECTION FROM SECONDARY MULTIPLEXER/DEMULTIPLEXER TO ONU, AND PERFORM REPAIR AND REPLACEMENT. MAINTENANCE PERSONNEL IS DISPATCHED TO LOCATION AT WHICH ONU IS INSTALLED TO REPAIR AND REPLACE ONU. |
| (0, *, 0) | INSUFFICIENT LIGHT INTENSITY. NO SWITCHING TO ANOTHER CHANNEL AND NO RECOVERY. | SAME AS ABOVE. HOWEVER, CONSIDERING POSSIBILITY THAT WAVELENGTH CONTROL ITSELF MIGHT NOT HAVE BEEN PERFORMED, FAILURE SUCH AS INACTIVITY OF WAVELENGTH-TUNABLE OPTICAL FILTER CONTROL UNIT OF ONU IS ASSUMED. | SAME AS ABOVE. HOWEVER, REPAIR AND REPLACE ONU EARLY AND CHECK OPERATION OF WAVELENGTH CONTROL. |

NOTE: "*" REPRESENTS VARIABLE.

Fig. 10

TUNABLE OPTICAL FILTER CONTROL APPARATUS AND TUNABLE OPTICAL FILTER CONTROL METHOD

CROSS-REFERENCE TO RELATED APPLICATIONS

This application is a National Stage application under 35 U.S.C. § 371 of International Application No. PCT/JP2019/018638, having an International Filing Date of May 9, 2019, which claims priority to Japanese Application Serial No. 2018-100064, filed on May 24, 2018. The disclosure of the prior application is considered part of the disclosure of this application, and is incorporated in its entirety into this application.

TECHNICAL FIELD

The present invention relates to a wavelength-tunable optical filter control apparatus and a wavelength-tunable optical filter control method.

BACKGROUND ART

In the related art, high-speed Internet in Fiber-To-The-Home (FTTH) and mobile services are facing continuously increasing numbers of users and have become indispensable for the daily lives of people. On the other hand, independent networks of FTTH and mobile services have been constructed for each service, which is inefficient in terms of operation. Thus, an access network for one apparatus that can accommodate a plurality of services has been proposed (for example, see Non Patent Literature 1).

In addition, in order to realize an access network that can accommodate multiple services, Wavelength Division Multiplex (WDM)/Time Division Multiplexing (TDM)-Passive Optical Networks (PON) that multiplex and utilize a plurality of wavelengths have become a standard in the International Telecommunication Union Telecommunication Standardization Sector (ITU-T) (e.g., see Non Patent Literature 2).

In WDM/TDM-PONS, users and services are multiplexed on a time axis and a wavelength axis. As a result, unlike TDM-PONs in the related art, on which multiplexing is performed on the time axis, more users and services can be accommodated and thus the magnitude of the systems can be greatly improved.

FIG. 11 is a diagram illustrating an example of an optical access system based on a WDM/TDM-PON. As illustrated in FIG. 11, optical line terminals (OLTs: subscriber termination equipment) 1-1 to 1-$n$ ($n$ is an integer greater than or equal to 1) installed in a telecommunications carrier base are configured to emit optical signals $\lambda_{dL1}$ to $\lambda_{dLn}$ having wavelengths in the bands of wavelength channels $\lambda_{d1}$ to $\lambda_{dn}$, and receive optical signals $\lambda_{uL1}$ to $\lambda_{uLn}$ in the bands of wavelength channels $\lambda_{u1}$ to $\lambda_{un}$, respectively. For example, the OLT 1-1 emits the optical signal $\lambda_{dL1}$ having a wavelength in the band of the wavelength channel $\lambda_{d1}$ and receives the optical signal $\lambda_{uL1}$ in the band of the wavelength channel $\lambda_{u1}$. In addition, the OLT 1-$n$ also emits the optical signal $\lambda_{dLn}$ having a wavelength in the band of the wavelength channel $\lambda_{dn}$, and receives the optical signal $\lambda_{uLn}$ in the band of the wavelength channel $\lambda_{un}$.

The light emitted from the OLTs 1-1 to 1-$n$ are aggregated by a secondary multiplexer/demultiplexer 3-1. In addition, the light received by each of the OLTs 1-1 to 1-$n$ are divided by another secondary multiplexer/demultiplexer 3-2. The secondary multiplexer/demultiplexers 3-1 and 3-2 are connected to a primary multiplexer/demultiplexer 4. The primary multiplexer/demultiplexer 4 is connected to one end of an optical access line 5 constituted by one-core optical fibers. The primary multiplexer/demultiplexer 4 has a function of transmitting and receiving the optical signal belonging to each wavelength channel via the optical access line 5, and a function of distinguishing a transmission or reception wavelength channel and linking each of the secondary multiplexer/demultiplexers 3-1 and 3-2 to wiring to be connected.

A splitter 6 that merges and/or splits drop lines that are pieces of wiring directed to optical network units (ONUs; subscriber terminating unit) is connected to the other end of the optical access line 5. The splitter 6 is connected to ONUs 2-1 to 2-$n$ by drop lines constituted by one-core optical fibers. All of the optical signals $\lambda_{dL1}$ to $\lambda_{dLn}$ sent from the OLT 1-1 to 1-$n$ are supplied to the ONUs 2-1 to 2-$n$, respectively, via the drop lines. In addition, each of the ONUs 2-1 to 2-$n$ transmits the optical signal having one wavelength in any band of the wavelength channels $\lambda_{u1}$ to $\lambda_{un}$ the OLTs 1-1 to 1-$n$.

In the ONUs 2-1 to 2-$n$, a combination of the wavelength channels of the optical signal to be transmitted and received is selected, and communication can be established between the ONUs 2-1 to 2-$n$ and any of the OLTs 1-1 to 1-$n$. And, in the ONUs 2-1 to 2-$n$, a transmission and/or reception wavelength is changed, and a communication partner can be selected from the OLTs 1-1 to 1-$n$.

As illustrated in FIG. 11, the ONUs 2-1 to 2-$n$ include a wavelength-tunable optical filter 21, a light receiving element 22, a light transmitting element 23, and a signal processing unit 24. The wavelength-tunable optical filter 21 is a filter that is configured to pass an optical signal having a specific wavelength among multiplexed optical signal, and the wavelength of passed optical signal is tunable. The light receiving element 22 is configured to convert an optical signal into an electrical signal. The light transmitting element 23 is configured to convert an electrical signal into an optical signal and to output the optical signal to a drop line. The signal processing unit 24 is configured to perform signal processing, such as amplification, waveform shaping, or the like, on the electrical signal converted by the light receiving element 22, and to perform signal processing necessary for transmission.

Between the OLTs 1-1 to 1-$n$ and the ONUs 2-1 to 2-$n$, in addition to the signals communicated using each optical signal, operation control commands from the OLTs 1-1 to 1-$n$ to the ONUs 2-1 to 2-$n$ and command responses and status notifications from the ONUs 2-1 to 2-$n$ to the OLTs 1-1 to 1-$n$ are superimposed in out of bands. As a result, connection relationships between the ONUs 2-1 to 2-$n$ and the OLTs 1-1 to 1-$n$, that is, assignment of wavelength channels to be transmitted and/or received at the ONUs 2-1 to 2-$n$ are sent from the OLTs 1-1 to 1-$n$.

Note that, although not illustrated in FIG. 11, the telecommunications carrier base has a function of controlling operations of an optical access system, the function including performing integrated control over each of the OLTs 1-1 to 1-$n$, and assigning association of the OLTs 1-1 to 1-$n$ with the ONUs 2-1 to 2-$n$; a function of connecting the OLTs 1-1 to 1-$n$ to a higher-order communication network; and an function of an optical access system maintainer base and a depot for materials or measurement devices to deal with failure of the optical access system.

FIG. 12 is a diagram schematically illustrating a relationship between a received light wavelength, a received light wavelength channel, and a band of the wavelength-tunable optical filter in the ONUs 2-1 to 2-*n*. In FIG. 12, the horizontal axis represents wavelength and the vertical axis represents light intensity. $\lambda_{d1}$ to $\lambda_{dn}$ and their ranges indicated in the horizontal axis direction indicate the wavelength bands of the wavelength channels $\lambda_{d1}$ to $\lambda_{dn}$. In the ranges of the wavelength bands of the wavelength channels $\lambda_{d1}$ to $\lambda_{dn}$, there are the optical signals $\lambda_{dL1}$ to $\lambda_{dLn}$ output from the OLTs 1-1 to 1-*n*, respectively. Note that in FIG. 12, the ONU 2-1 will be described as an example.

The bold line 8 in FIG. 12 represents a wavelength band of the wavelength-tunable optical filter 21 that is included in the ONU 2-1 and has the function of receiving an optical signal of a desired wavelength channel (e.g., wavelength channel $\lambda_{d1}$). The bandwidth of the wavelength-tunable optical filter 21 has sufficient wavelength selection characteristics for the width of the band of the wavelength channel, and it is possible to select and receive an optical signal having a wavelength within the wavelength channel. In addition, the operation control of the optical access system causes the band of the wavelength-tunable optical filter 21 to be shifted to the band of any wavelength channel, and thus a wavelength channel to be received can be freely selected. In FIG. 12, a state in which the wavelength-tunable optical filter 21 has shifted to the wavelength channels $\lambda_{d1}$ to $\lambda_{dn}$ is shown. The band of the wavelength-tunable optical filter 21 after the shifting is as indicated by the dashed line 9.

In a WDM-based optical communication system, a transmission and/or reception wavelength of light used for communication being within the range of a prescribed wavelength channels is a requirement for communication establishment. As a method for correcting a discrepancy in wavelength of light, the technology described in Patent Literature 1, for example, has been proposed. The technology described in Patent Literature 1 is a technique of operating an optical filter to track wavelength variations of an optical signal passed through the optical filter.
Specifically, while a wavelength of the optical filter is caused to be shifted, the intensity of light passed through the optical filter is observed intermittently, the intensity at which the minimum difference in the amount is observed is set as a wavelength of the optical signal, further the ambient temperature of the optical filter is measured, and a wavelength discrepancy caused by temperature change of the optical filter is also corrected. When the intensity of the transmitted light is measured, part of the light that has been passed through the filter is divided using an optical splitter and is led to a detector for intensity measurement.

CITATION LIST

Patent Literature

Patent Literature 1: JP 2005-172975A

Non Patent Literature

Non Patent Literature 1: "General overview of NGN, "ITU-T Recommendation Y. 2001 Non Patent Literature 2: "40-Gigabit-capable passive optical network (NG-PON2): General requirements," ITU-T Recommendation G.989.1

SUMMARY OF THE INVENTION

Technical Problem

In a WDM/TDM-PON, data is multiplexed on the time axis as well as the wavelength axis. Thus, the ONUs 2-1 to 2-*n* include the wavelength-tunable optical filter and cause a light wavelength selected by the wavelength-tunable optical filter to be shifted to the wavelength of the wavelength channel indicated by the OLTs 1-1 to 1-*n*, thereby selectively receiving a signal of the corresponding wavelength channel.

However, due to certain reasons such as a fluctuation in the apparatus operating environment, an excessive shifting at the time of a switch of a wavelength channel, too a small shifting, and the like, communication failure may occur in a case in which there may be a discrepancy in a wavelength band selected by the wavelength-tunable optical filter from a wavelength of the optical signal of a desired wavelength channel and thus it is difficult to receive the optical signal.

Furthermore, in the telecommunications carrier base, where the OLTs 1-1 to 1-*n*, a wavelength merging-splitting filter, and the like, all playing a pivotal role in the optical access communication system, are installed, an operation environment including temperature and humidity, power supply voltage fluctuation, vibration, and the like is generally more stable than those of a user home environment where the ONUs 2-1 to 2-*n* are installed. As such, even though errors such as a wavelength discrepancy are more likely to occur on the ONUs 2-1 to 2-*n* side, functionality for maintenance and operation is not provided in general due to simplification of the ONUs 2-1 to 2-*n*. Thus, it is difficult to expect the optical access communication system to autonomously recover at the time of occurrence of a wavelength discrepancy.

Therefore, in the case in which an error occurs in the ONUs 2-1 to 2-*n*, for the purpose of replacing the ONUs 2-1 to 2-*n* or adjusting the optical wavelength filter, a technician is sent to a user's home and replace the ONUs 2-1 to 2-*n* or the wavelength filter, and thus it takes time for recovery, which is a problem.

In view of the above circumstances, an object of the present invention is to provide a technology capable of shortening a time required for recovery.

Means for Solving the Problem

An aspect of the present invention is a wavelength-tunable optical filter control apparatus in an optical access system that uses a wavelength-multiplexed optical signal of a plurality of wavelength channels, the wavelength-tunable optical filter control apparatus including: a wavelength-tunable optical filter configured to pass an optical signal of a specific wavelength channel among the plurality of wavelength channels; a light receiving element configured to convert the optical signal that has passed through the wavelength-tunable optical filter into an electrical signal; a signal quality determining unit configured to determine a quality of the electrical signal; and a wavelength-tunable optical filter control unit configured to acquire a light intensity of the electrical signal and control a wavelength of the wavelength-tunable optical filter based on the acquired light intensity and a determination result of the quality of the electrical signal.

An aspect of the present invention is the above-described wavelength-tunable optical filter control apparatus, in which, in a case in which a predetermined condition is satisfied, the wavelength-tunable optical filter control unit is configured to correct a wavelength discrepancy of the wavelength-tunable optical filter based on a relationship between the light intensity and the wavelength of the wavelength-tunable optical filter, the wavelength being obtained by causing the wavelength of the wavelength-tunable optical filter to be shifted alternately in a shorter wavelength direction and a longer wavelength direction.

An aspect of the present invention is the wavelength-tunable optical filter control apparatus in which, in a case in which an abnormality is detected in reception of the optical signal, the wavelength-tunable optical filter control unit is configured to cause the wavelength of the wavelength-tunable optical filter to be shifted to another wavelength by a magnitude comparable to a band of the wavelength channel in use.

An aspect of the present invention is the wavelength-tunable optical filter control apparatus, in which, in a case in which an abnormality is detected in the reception of the optical signal even after the wavelength of the wavelength-tunable optical filter has been shifted to the other wavelength by the magnitude comparable to the band of the wavelength channel in use, the wavelength-tunable optical filter control unit is configured to switch the wavelength channel of the wavelength-tunable optical filter to a wavelength channel before switching.

An aspect of the present invention is the wavelength-tunable optical filter control apparatus, in which, in a case in which an abnormality is detected in the reception of the optical signal even after the wavelength of the wavelength-tunable optical filter has been shifted to the other wavelength by the magnitude comparable to the band of the wavelength channel in use, the wavelength-tunable optical filter control unit is configured to switch the wavelength of the wavelength-tunable optical filter to all wavelength channels to control the wavelength of the wavelength-tunable optical filter.

An aspect of the present invention is the wavelength-tunable optical filter control apparatus, in which the wavelength-tunable optical filter control unit is configured to externally output values each indicating states including a state of the light intensity after an end of the wavelength control of the wavelength-tunable optical filter, a state of the signal, and a switching state of the wavelength channel, the values being available for inferring a location of a failure in the optical access system.

An aspect of the present invention is a wavelength-tunable optical filter control method performed by a wavelength-tunable optical filter control apparatus in an optical access system that uses a wavelength-multiplexed optical signal of a plurality of wavelength channels, the wavelength-tunable optical filter control method including: a signal quality determining step to determine a quality of an electrical signal converted by a light receiving element configured to convert an optical signal that has passed through a wavelength-tunable optical filter configured to pass the optical signal of a specific wavelength channel among the plurality of wavelength channels into an electrical signal; and a wavelength-tunable optical filter controlling step to acquire a light intensity of the electrical signal and to control a wavelength of the wavelength-tunable optical filter based on the acquired light intensity and a determination result of the quality of the electrical signal.

Effects of the Invention

According to the present invention, it is possible to shorten a time required for recovery.

BRIEF DESCRIPTION OF DRAWINGS

FIG. 10 is a diagram illustrating an example of a correspondence table used in inference of a location of a failure.

DESCRIPTION OF EMBODIMENTS

Embodiments of the present invention will be described below with reference to the drawings.

First Embodiment

Figure 1:
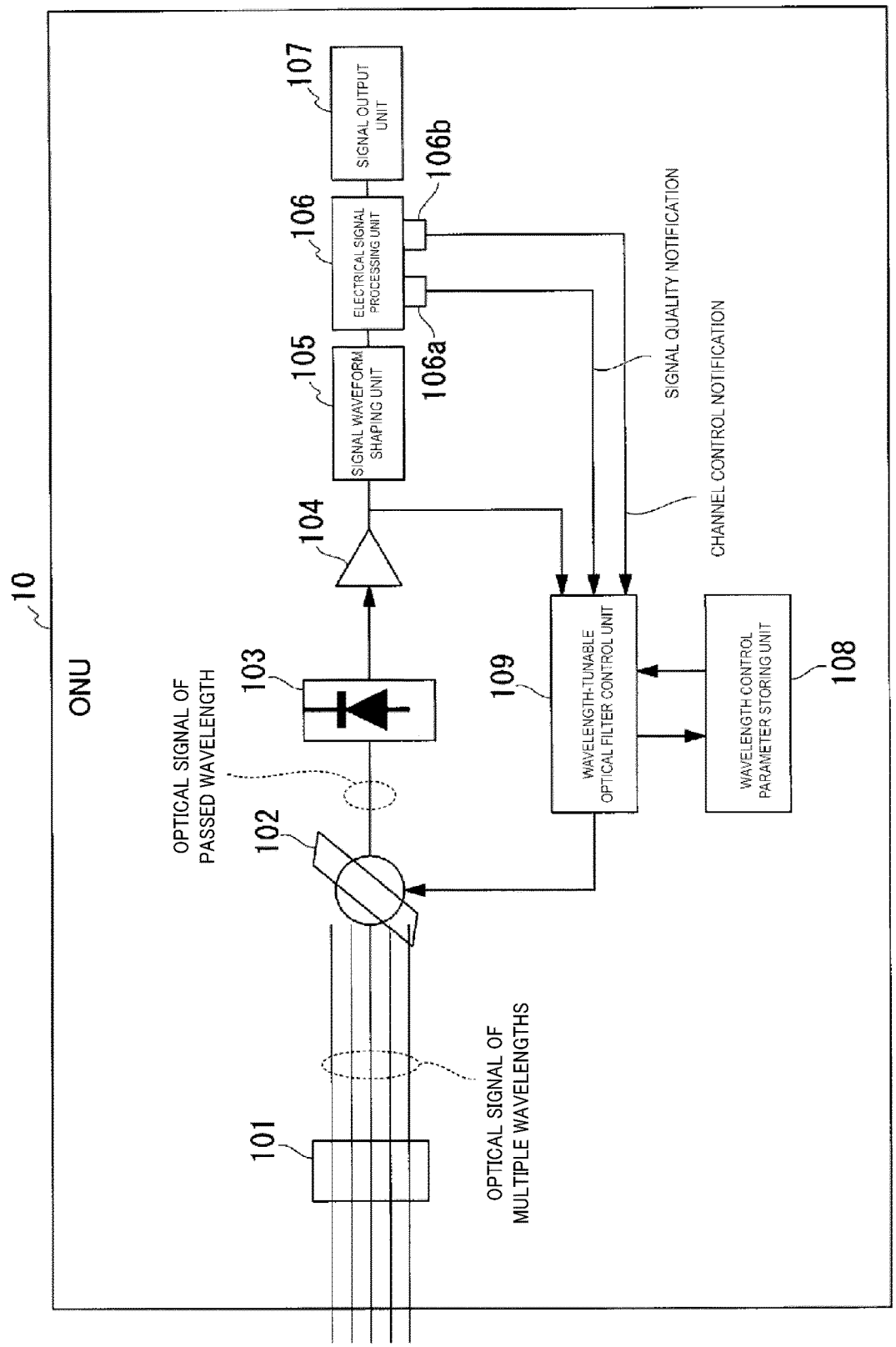
FIG. 1 is a diagram illustrating a functional configuration of an ONU according to a first embodiment.

FIG. 1 is a diagram illustrating a functional configuration of an ONU 10 according to a first embodiment. The ONU 10 includes an optical signal input unit 101, a wavelength-tunable optical filter 102, a light receiving element 103, a signal amplifying unit 104, a signal waveform shaping unit 105, an electrical signal processing unit 106, a signal output unit 107, a wavelength control parameter storing unit 108, and a wavelength-tunable optical filter control unit (a wavelength-tunable optical filter controller) 109. The ONU 10 is a mode of a wavelength-tunable optical filter control apparatus (a tunable optical filter control apparatus).

The optical signal input unit 101 is configured to input an optical signal of a multi-wavelength channel that has been wavelength-multiplexed into one optical fiber. The wavelength-tunable optical filter 102 is a filter that is configured to pass an optical signal of a specific wavelength of the optical signal input through the optical signal input unit 101, and a wavelength of the passed optical signal is tunable. Thus, the wavelength-tunable optical filter 102 has wavelength selection characteristics. Wavelengths and wavelength channels passed by the wavelength-tunable optical filter 102 are controlled by the wavelength-tunable optical filter control unit 109.

The light receiving element 103 is configured to convert the optical signal having a wavelength passed through the wavelength-tunable optical filter 102 into an electrical signal. The signal amplifying unit 104 is configured to amplify the electrical signal. The signal amplifying unit 104 is configured to output the amplified electrical signal to the signal waveform shaping unit 105 and the electrical signal processing unit 106.

The signal waveform shaping unit 105 is configured to perform waveform shaping on the electrical signal output from the signal amplifying unit 104.

The electrical signal processing unit 106 is configured to convert the electrical signal that has undergone the amplification and waveform shaping into a desired signal form, and to output the converted electrical signal to the signal output unit 107. The electrical signal processing unit 106 includes a signal quality determining unit (a signal quality determiner) 106a and a channel control processing unit 106b. The signal quality determining unit 106a is configured to perform determination of whether the amplified and waveform-shaped electrical signal has a good or poor quality. The channel control processing unit 106b is configured to process assignment of a wavelength channel to be used, the assignment having been transmitted from an OLT. The determination of whether the signal has a good or poor quality depends on specifications of an optical access system to which the embodiment will be applied. In the present embodiment, the result of the determination of whether the signal has a good or poor quality is to be binary values indicating good or poor. However, in a case where the result has multiple values according to the specifications of the optical access system as an application target, it is possible to appropriately aggregate values and reinterpret them as binary values. The signal quality determining unit 106a is configured to output, to the wavelength-tunable optical filter control unit 109, a signal quality notification indicating the result of the signal quality determination. The signal quality notification is a notification of the quality of the electrical signal. The signal quality notification includes the result of the quality determination of the electrical signal, that is, the value indicating either "good" or "poor." The channel control processing unit 106b outputs a channel control notification to the wavelength-tunable optical filter control unit 109 based on the assignment of the wavelength channel sent by the OLT. The channel control notification is a notification instructing that the wavelength channel to be passed through the wavelength-tunable optical filter 102 be changed.

The signal output unit 107 is configured to externally output the electrical signal converted into a desired signal form by the electrical signal processing unit 106. The wavelength control parameter storing unit 108 is configured to store the wavelength of light to be passed through the wavelength-tunable optical filter 102 in association with a parameter for controlling the wavelength-tunable optical filter 102.

The parameter may be, for example, a position or a rotation angle of the filter, a current, a voltage, heat, a temperature, or the like used to change optical characteristics as long as the parameter can establish a unique relationship with the wavelength of light to be passed. Furthermore, the wavelength control parameter storing unit 108 is configured to store information relating to operations such as a history of wavelength control by the wavelength-tunable optical filter control unit 109. The wavelength control parameter storing unit 108 is configured using a storage device such as a magnetic hard disk device or a semiconductor storage device.

The wavelength-tunable optical filter control unit 109 is configured to control the wavelength-tunable optical filter 102. For example, the wavelength-tunable optical filter control unit 109 is configured to control the wavelength-tunable optical filter 102 such that a wavelength channel of the wavelength-tunable optical filter 102 is changed according to a channel control notification output from the channel control processing unit 106b. In addition, the wavelength-tunable optical filter control unit 109 is configured to measure an intensity of the optical signal using the electrical signal output from the signal amplifying unit 104. Then, the wavelength-tunable optical filter control unit 109 is configured to control the wavelength of the wavelength-tunable optical filter 102 based on the light intensity and the parameters stored in the wavelength control parameter storing unit 108.

Figure 2:
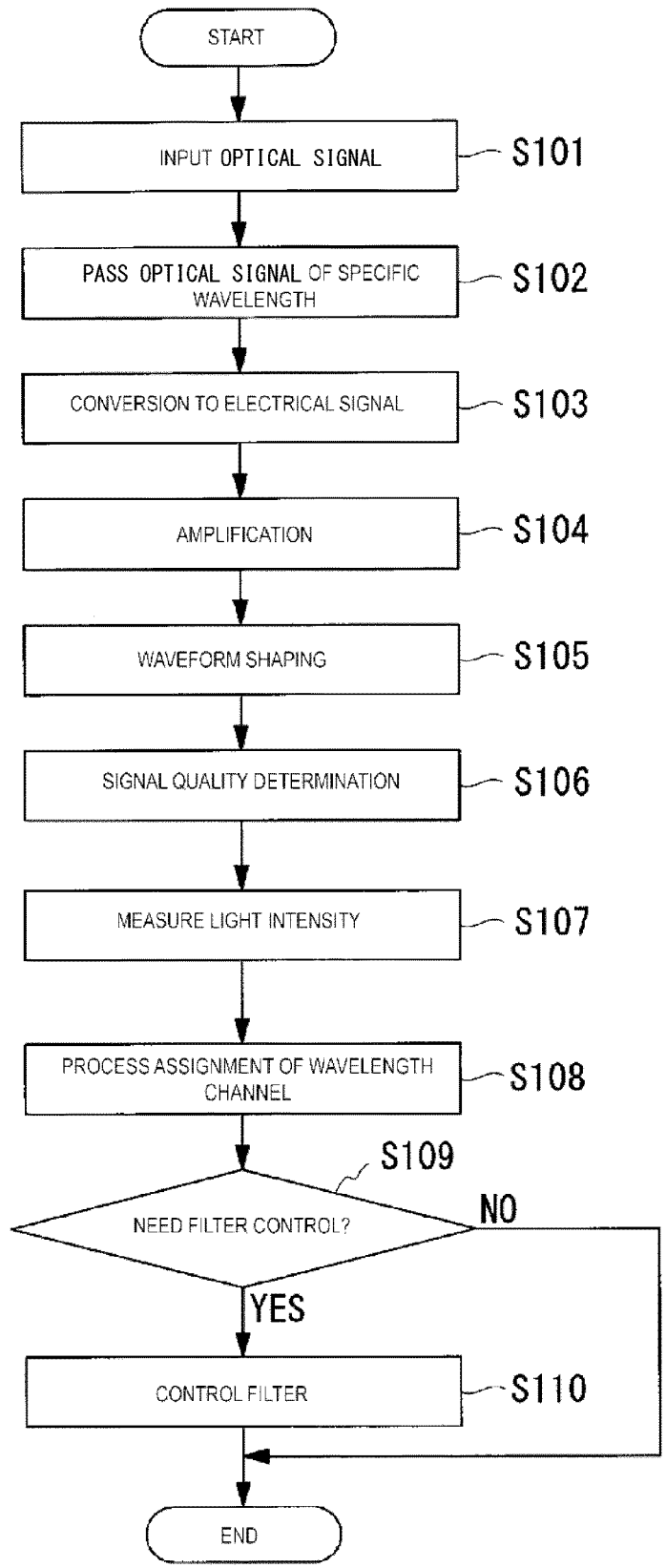
FIG. 2 is a flowchart illustrating a filter control process by the ONU according to the first embodiment.

FIG. 2 is a flowchart illustrating a filter control process by the ONU 10 according to the first embodiment.

The optical signal input unit 101 inputs an optical signal of a multi-wavelength channel that has been wavelength-multiplexed into one optical fiber (step S101). The optical signal input unit 101 outputs the input optical signal of the multi-wavelength channel to the wavelength-tunable optical filter 102. The wavelength-tunable optical filter 102 selects and passes the optical signal of one wavelength channel out of the optical signal of the multi-wavelength channel output from the optical signal input unit 101 (step S102). The optical signal of one wavelength channel passed through the wavelength-tunable optical filter 102 is input to the light receiving element 103.

The light receiving element 103 converts the input optical signal into an electrical signal (step S103). The light receiving element 103 outputs the electrical signal to the signal amplifying unit 104. The signal amplifying unit 104 amplifies the electrical signal output from the light receiving element 103 (step S104). The signal amplifying unit 104 outputs the amplified electrical signal to the signal waveform shaping unit 105 and the electrical signal processing unit 106.

The signal waveform shaping unit 105 performs waveform shaping on the electrical signal output from the signal amplifying unit 104 (step S105). The signal waveform shaping unit 105 outputs the waveform-shaped electrical signal to the electrical signal processing unit 106. The signal quality determining unit 106a of the electrical signal processing unit 106 determines whether the electrical signal output from the signal waveform shaping unit 105 has a good or poor quality (step S106). Then, the channel control processing unit 106b included in the electrical signal processing unit 106 analyzes the assignment of the wavelength channel sent from the OLT and outputs a channel control notification.

The signal quality determining unit 106a included in the electrical signal processing unit 106 generates a signal quality notification. The signal quality determining unit 106a of the electrical signal processing unit 106 outputs the generated signal quality notification to the wavelength-tunable optical filter control unit 109.

The wavelength-tunable optical filter control unit 109 measures the intensity of the optical signal using the electrical signal output from the signal amplifying unit 104 (step S107). If the quality of the electrical signal is "good" and the intensity of the optical signal is greater than or equal to a threshold value, the optical signal sent from the OLT can be received by the ONU 10. When a signal assigning the wavelength channel sent from the OLT is received, the electrical signal processing unit 106 analyzes the details of the assignment using the channel control processing unit 106b, and outputs a channel control notification to the wavelength-tunable optical filter control unit 109 for causing the wavelength passed through the filter to be shifted to the assigned wavelength channel (step S108).

Then, the wavelength-tunable optical filter control unit 109 determines whether the wavelength-tunable optical filter 102 needs to be controlled (step S109). Specifically, in a case in which the channel control processing unit 106b outputs the channel control notification, the wavelength-tunable optical filter control unit 109 performs a control operation to cause the wavelength passed through the wavelength-tunable optical filter 102 to be shifted to the wavelength channel indicated by the notification. Additionally, in either a case in which the measured light intensity is not within the range of the preset threshold or a case in which a signal quality notification indicating that the quality of the electrical signal is "poor" is output from the signal quality determining unit 106a, it is determined that the wavelength-tunable optical filter 102 needs to be controlled. The case in which the light intensity is not within the range of the preset threshold refers to, for example, a case in which the light intensity is below or above the threshold. Note that the wavelength-tunable optical filter control unit 109 can measure fluctuations in light intensity as well, and thus a temporal fluctuation can also be recognized.

On the other hand, the wavelength-tunable optical filter control unit 109 determines that the wavelength-tunable optical filter 102 does not need to be controlled in a case in which no channel control notification is output from the channel control processing unit 106b and the signal quality notification indicating that the signal quality is "good" is output from the signal quality determining unit 106a. In addition, the wavelength-tunable optical filter control unit 109 determines that the wavelength-tunable optical filter 102 does not need to be controlled in a case in which a channel control notification assigning the current wavelength channel is output. Furthermore, the wavelength-tunable optical filter control unit 109 determines that the wavelength-tunable optical filter 102 does not need to be controlled in a case in which the measured light intensity is within the range of the preset threshold.

In a case in which the wavelength-tunable optical filter 102 does not need to be controlled (step S109: NO), the ONU 10 terminates the process of FIG. 2.

On the other hand, in a case in which the wavelength-tunable optical filter 102 needs to be controlled (step S109: YES), the wavelength-tunable optical filter control unit 109 controls the wavelength-tunable optical filter 102 (step S110). Specifically, in a case in which a wavelength channel that is different from the wavelength channel currently set is assigned by the channel control notification, the wavelength-tunable optical filter 102 controls the wavelength-tunable optical filter 102 for shifting the wavelength channel to a newly assigned wavelength channel Additionally, in either a case in which the measured light intensity is not within the range of the preset threshold or a case in which a signal quality notification indicating that the quality of the electrical signal is "poor" is output from the signal quality determining unit 106a, the wavelength-tunable optical filter control unit 109 controls the wavelength-tunable optical filter 102 such that the filter changes the wavelength channel to a wavelength channel that is different from the currently set wavelength channel. Wavelength channels different from the currently set wavelength channel may be selected randomly or sequentially. In addition, when performing wavelength control, the wavelength-tunable optical filter control unit 109 refers to the parameters stored in the wavelength control parameter storing unit 108 and provides a parameter (an appropriate physical quantity) associated with the wavelength of light passed through the wavelength-tunable optical filter 102, to the wavelength-tunable optical filter 102 in the wavelength control of the wavelength-tunable optical filter 102.

According to the ONU 10 configured as described above, the wavelength-tunable optical filter 102 can be controlled autonomously according to a light intensity and a signal quality. Thus, there is no need to send a technician to a user's home to replace the ONU 10 or replace the wavelength filter whenever a problem occurs in the ONU 10. As a result, a time required for recovery can be shortened.

Modification Example

The wavelength-tunable optical filter control unit 109 may measure a numerical value corresponding to each wavelength channel in advance and store the value in the wavelength control parameter storing unit 108, or may calculate a wavelength separately from parameters stored in the wavelength control parameter storing unit 108 using interpolation or the like, in a case where there is a wavelength discrepancy of the wavelength-tunable optical filter 102. In addition, in a case in which there is a discrepancy in the relationship between the wavelength of the wavelength-tunable optical filter 102 and the parameters, the wavelength-tunable optical filter control unit 109 can additionally store a value for correcting the discrepancy in the wavelength control parameter storing unit 108 to compensate for the wavelength discrepancy of the wavelength-tunable optical filter 102.

Second Embodiment

In a second embodiment, the wavelength-tunable optical filter control unit 109 differs from that of the first embodiment in the method of wavelength control performed on the wavelength-tunable optical filter 102. Other configurations are the same as those in the first embodiment, and thus only differences will be described.

Figure 3:
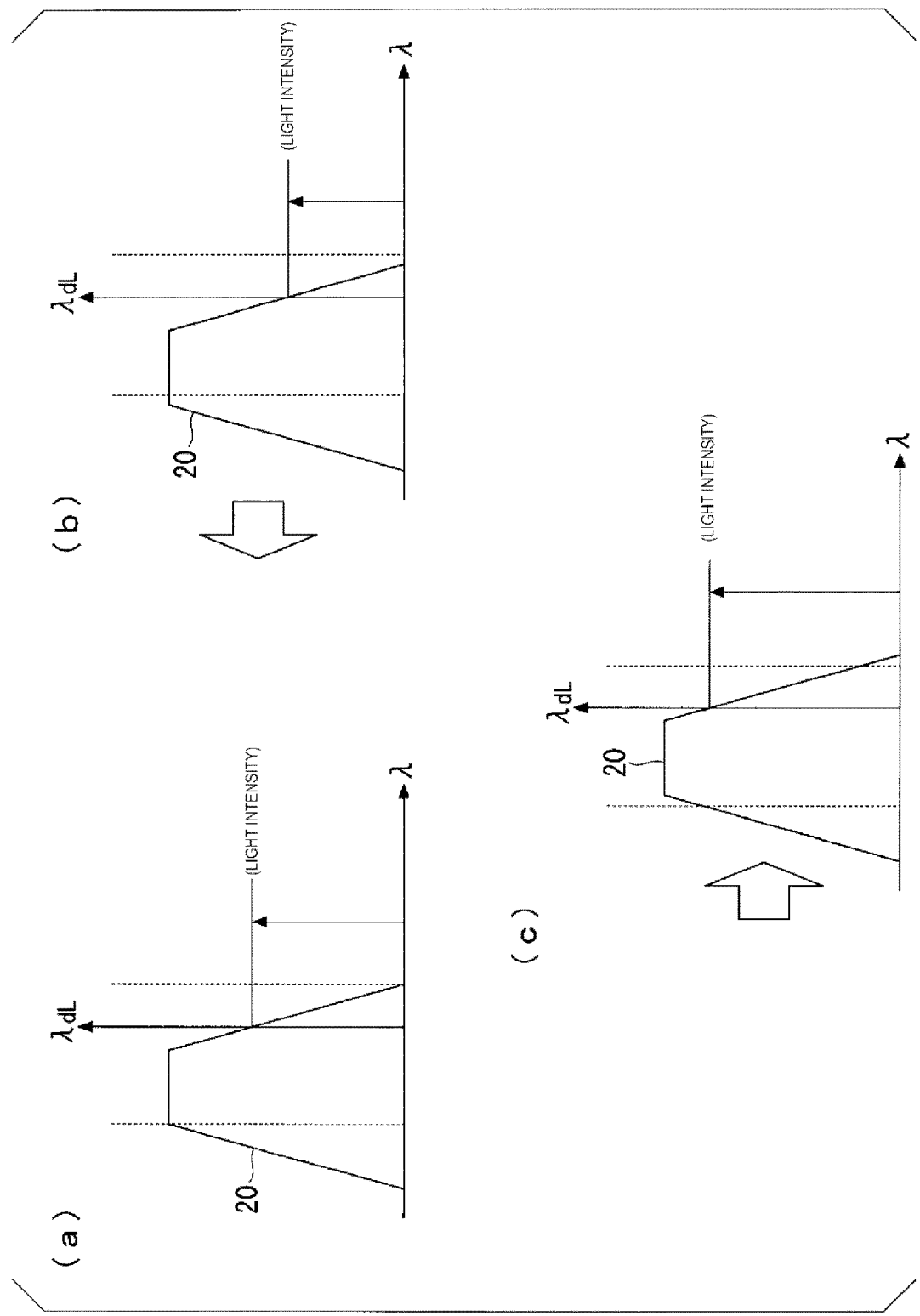
FIG. 3 is a diagram schematically illustrating wavelength control according to a second embodiment.

FIG. 3 is a diagram schematically illustrating wavelength control according to the second embodiment. In FIG. 3, the horizontal axis represents wavelength and the vertical axis represents intensity of the light. In FIG. 3, an optical signal $\lambda_{dL}$ is present in the wavelength channel band indicated by the dashed lines. The bold line 20 shown in FIG. 3 represents the wavelength band of the wavelength-tunable optical filter 102. The height of the intersection of the vertical line indicating the optical signal $\lambda_{dL}$ and the wavelength band of the wavelength-tunable optical filter 102 in the vertical axis direction represents the intensity of an optical signal passing through the wavelength-tunable optical filter 102.

The band of the wavelength-tunable optical filter 102 is controlled by the wavelength-tunable optical filter control unit 109 such that the band is caused to be shifted to the short wavelength side or the long wavelength in an alternating manner at an amplitude at which the band does not deviate from the wavelength channel of the received light and overlap an adjacent wavelength channel and at a speed sufficient to detect the wavelength discrepancy of the wavelength-tunable optical filter 102 and recover therefrom.

FIG. 3(a) illustrates a state in which there is a discrepancy in the band of the wavelength-tunable optical filter 102 to the short wavelength side with respect to the band of a wavelength channel. The intensity of the optical signal passing through the wavelength-tunable optical filter 102 at this time is as illustrated in FIG. 3(a).

FIG. 3(b) illustrates a state in which the band of the wavelength-tunable optical filter 102 being shifted slightly to the shorter wavelength from the state of FIG. 3(a). In the example illustrated in FIG. 3(b), it can be seen that the light intensity has decreased further than the light intensity illustrated in FIG. 3(a).

FIG. 3(c) illustrates a state in which the band of the wavelength-tunable optical filter 102 is shifted in the opposite direction to that in FIG. 3(b), that is, to the longer wavelength side from the state of FIG. 3(a). In the example illustrated in FIG. 3(c), it can be seen that a light intensity greater than the light intensities illustrated in FIGS. 3(a) and 3(b) has been obtained.

As illustrated in FIGS. 3(a) to 3(c), it is possible for the ONU 10 to identify the relationship between the direction of the wavelength shift and the intensity of an optical signal. For example, in the situations of FIG. 4, the ONU 10 can identify that there is a discrepancy in the wavelength-tunable optical filter 102 to the shorter wavelength side, and thus, the wavelength discrepancy of the filter can be corrected by causing the overall wavelength of the wavelength-tunable optical filter 102 to be shifted from the short wavelength side to the long wavelength side.

The wavelength-tunable optical filter control unit 109 controls wavelength-tunable optical filter 102 to cause the band of the wavelength-tunable optical filter 102 to keep shifting slightly to the short wavelength side and the long wavelength side periodically, and thus can obtain the relationship between the wavelength and the intensity of light. Here, the wavelength-tunable optical filter control unit 109 controls the wavelength band of the wavelength-tunable optical filter 102 in a direction in which the light intensity increases or in a direction opposite to the direction in which the light intensity decreases, and thus corrects the discrepancy between the band of the wavelength-tunable optical filter 102 and the optical signal.

Figure 4:
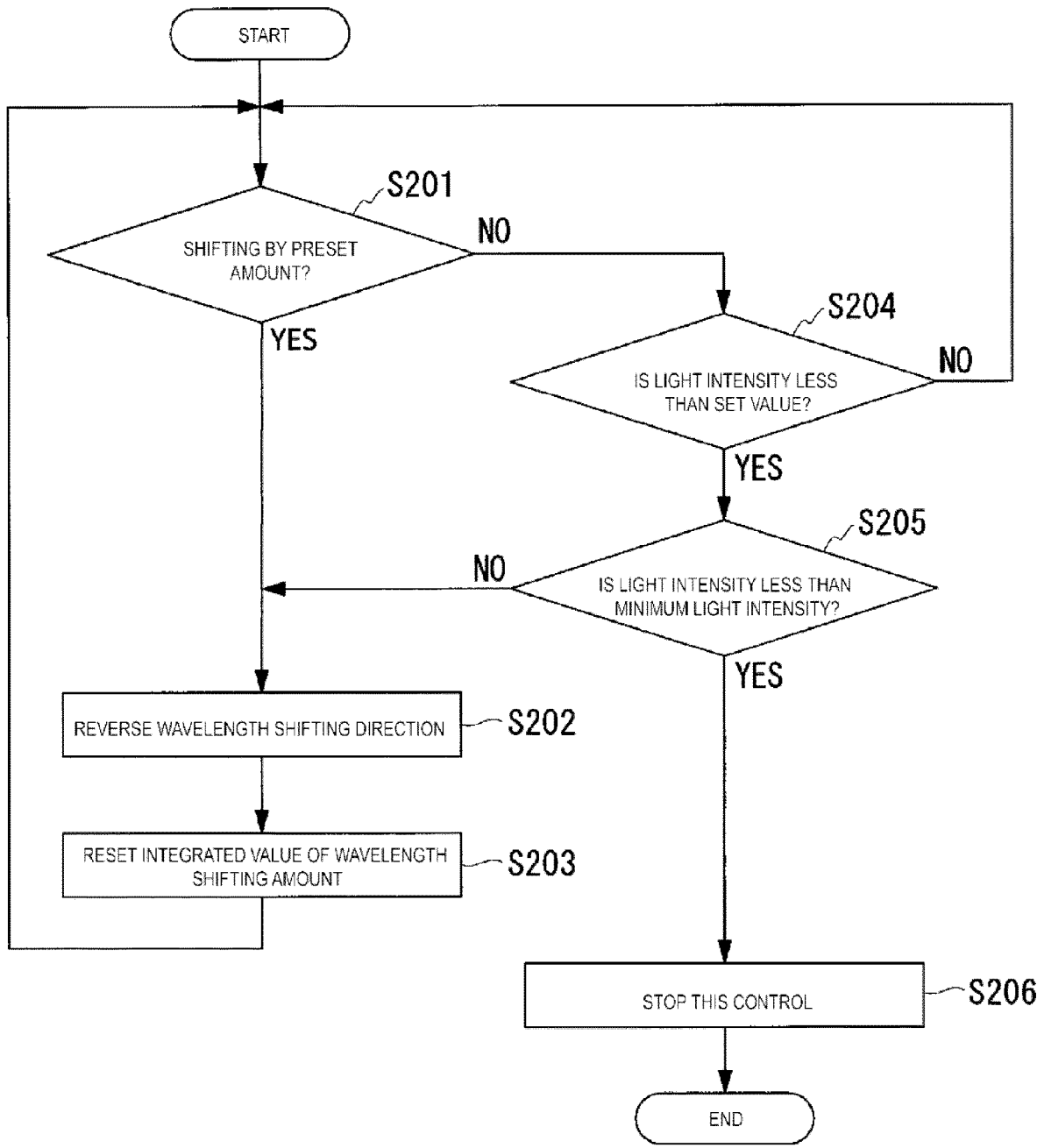
FIG. 4 is a flowchart illustrating a filter control process by the ONU according to the second embodiment.

FIG. 4 is a flowchart illustrating a filter control process by the ONU 10 according to the second embodiment. Note that the process illustrated in FIG. 4 may be performed at all times, or may be started or terminated with some trigger, such as a variation in light intensity (e.g., a sudden decrease or a sudden increase).

The wavelength-tunable optical filter control unit 109 performs control such that a wavelength of the wavelength-tunable optical filter 102 is caused to be shifted to either the short wavelength side or the long wavelength side. To which side between the short wavelength side and the long wavelength side shifting is to be made may be preset or may be specified externally. The magnitude and orientation of the wavelength shifting can be recognized and controlled as a change in a wavelength control parameter by the ONU 10. Note that the amount of shifting in one process may be preset. A method of controlling a micro shifting of the band of the filter wavelength may be a method of periodically controlling shifting, and the waveform may be, for example, sinusoidal or sawtooth with respect to time.

The wavelength-tunable optical filter control unit 109 integrates the amounts of wavelength shifted. Note that the wavelength-tunable optical filter control unit 109 measures the light intensity of the electrical signal obtained at the wavelength by shifting, after each shifting of the wavelength. The wavelength-tunable optical filter control unit 109 determines whether to perform shifting by a preset amount (step S201).

In a case in which the wavelength-tunable optical filter control unit 109 causes shifting by a preset amount (step S201: YES), the wavelength-tunable optical filter control unit 109 controls the wavelength-tunable optical filter 102 to reverse the wavelength shifting direction (step S202). Thereafter, the wavelength-tunable optical filter control unit 109 resets an integrated value of a wavelength shifting amount (step S203). Then, the ONU 10 repeatedly performs the processes from step S201.

In the process of step S201, in a case in which shifting is not made by the preset amount (step S201: NO), the wavelength-tunable optical filter control unit 109 determines whether the measured light intensity is less than a set value (step S204). If the set value is set to be greater than a minimum light intensity allowed by the optical access system to which the present technology is applied, the optical access system ensures optical communication to be continued even when wavelength control of the optical filter described in the present example is performed. Note that the light intensity at which determination of the wavelength shifting is to be performed may be predetermined, or a threshold of the wavelength inversion may be determined from a reduced amount of light intensity with respect to the amount of shifting of the optical filter band. The actual settings of the width of the wavelength shifting of the optical filter and the amount of shifting per time are decided considering the specifications and operating characteristics of the optical access system.

If the light intensity is not less than the set value (step S204: NO), the ONU 10 repeatedly performs the process from step S201.

On the other hand, if the light intensity is less than the set value (step S204: YES), the wavelength-tunable optical filter control unit 109 determines whether the measured light intensity is less than the minimum light intensity allowed by the light access system to which the present technology is applied (step S205). If the light intensity is less than the minimum allowable light intensity (step S205: YES), the wavelength-tunable optical filter control unit 109 stops the control as a reception error (e.g., loss of a received signal) (step S206).

On the other hand, if the light intensity is not less than the minimum allowable light intensity (step S205: NO), the wavelength-tunable optical filter control unit 109 controls the wavelength-tunable optical filter 102 to reverse the wavelength shifting direction (step S202).

According to the ONU 10 of the second embodiment configured as described above, in a case in which the light intensity continues to be a sufficient intensity, the wavelength is caused to continuously be shifted to a preset amount, then the wavelength shifting direction is reversed and the wavelength shifting is repeated. However, in a case in which the light intensity decreases in the middle of the wavelength shifting and falls below a predetermined value, the wavelength-tunable optical filter control unit 109 immediately reverses the wavelength shifting direction and performs control such that the intensity of light passing through the wavelength-tunable optical filter 102 increases.

In this manner, while reception is maintained at a light reception intensity that is greater than a preset light intensity, the wavelength discrepancy of the wavelength-tunable optical filter 102 can be automatically detected and corrected, and thereby the optical communication can be maintained. Thus, there is no need to send a technician to a user's home to replace the ONU 10 or replace the wavelength filter whenever a problem occurs in the ONU 10. As a result, a time required for recovery can be shortened.

Modification Example

Although the process of wavelength shifting is continuously repeated in a case in which the light intensity is less than the set value in FIG. 4, this operation may be stopped. For example, the wavelength-tunable optical filter control unit 109 stores the light intensity after the shifting, and stops the process of FIG. 4 in a shifting in which the light intensity reaches a maximum value as a condition for normal termination

Third Embodiment

In a case in which there is a discrepancy in a filter band too quick or too large to the extent that it is hard to capture it in a manner in which the filter band is subjected to a micro shifting according to the second embodiment, the filter control would not be on time and the reception would fail. In this case, in the ONU 10, the failure can be identified as a reception error illustrated in FIG. 4, but further improvement will not be expected. It is also conceivable that, when there is a great discrepancy in the filter band, the band of the wavelength-tunable optical filter 102 may overlap an adjacent wavelength channel due to the specifications of the wavelength channel of the optical access system, thus contaminate the optical signal of the adjacent wavelength channel, and even if the light intensity is sufficient, normal signal reception will not be possible.

Figure 5:
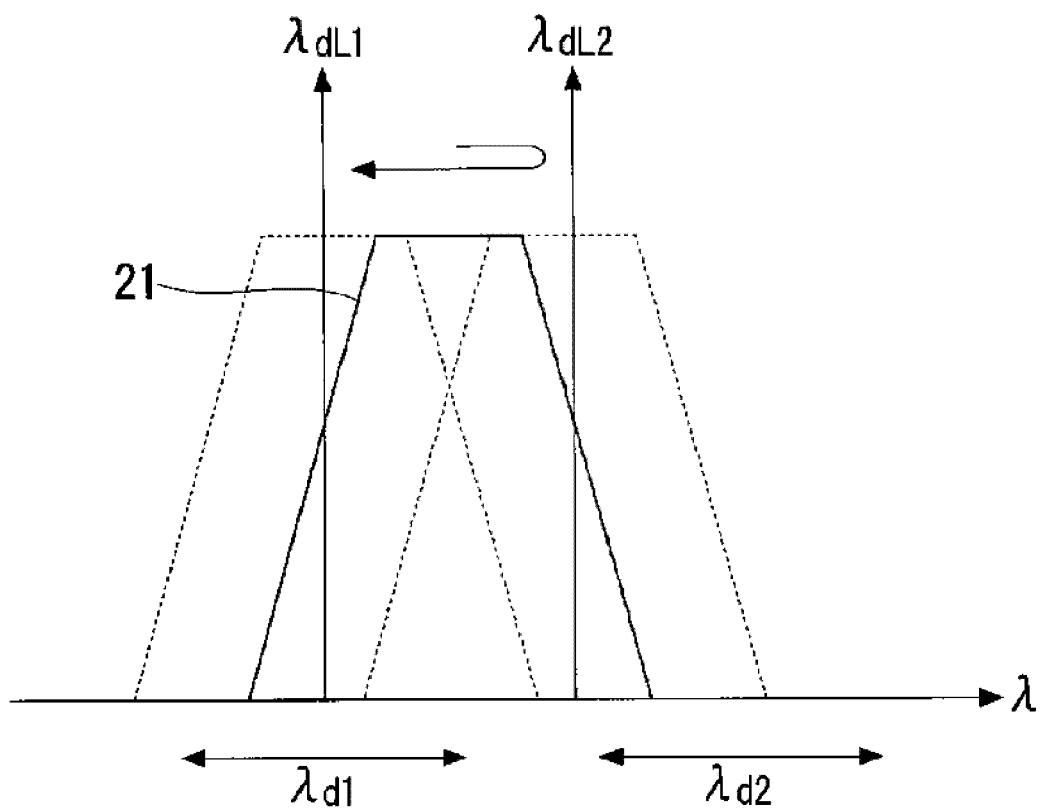
FIG. 5 is a diagram for describing a problem that arises in a case in which a wavelength of a wavelength-tunable optical filter is shifted.

FIG. 5 is a diagram for describing a problem arising in a case in which a wavelength of the wavelength-tunable optical filter 102 is caused to be shifted. In FIG. 5, the horizontal axis represents wavelength and the vertical axis represents intensity of light. The bold line 21 shown in FIG. 5 represents a wavelength band of the wavelength-tunable optical filter 102, where there is a discrepancy in the wavelength, and the discrepancy is large enough that the wavelength band overlaps an adjacent channel (e.g., an adjacent channel $\lambda_{d2}$ of $\lambda_{d1}$). As illustrated in FIG. 5, depending on the arrangement of the wavelengths $X_{dL1}$ and $\lambda_{dL2}$ of each optical signal of the wavelength channels $\lambda_{d1}$ and $\lambda_{d2}$, the adjacent channel may overlap the band of the wavelength-tunable optical filter 102 and may be received as an optical signal. If autonomous recovery is intended in a case in which there is a discrepancy in the wavelength band of the wavelength-tunable optical filter 102, and the discrepancy is large compared to a wavelength channel, it is necessary to prepare a process for a large filter wavelength shifting as well as for confirming recovery, including taking determination of normality of the received signal into consideration.

The determination of normality of the received signal is typically incorporated into a link establishment procedure between the OLT and the ONU in the optical access communication system, and thus the ONU 10 is capable of confirming the determination of normality. To solve this problem, in a third embodiment, in addition to the minute wavelength shifting control illustrated in FIG. 4 in the second embodiment, the band of the wavelength-tunable optical filter control unit 109 is caused to be shifted repeatedly by a magnitude comparable to the band of a wavelength channel at the time of a reception error (in step S206), and thereby recovery is achieved. Note that the configuration of the ONU 10 in the third embodiment is the same as that of the ONU 10 of the second embodiment, except for some processes performed by the wavelength-tunable optical filter control unit 109. The difference will be mainly described below.

The wavelength-tunable optical filter control unit 109 causes the band of the wavelength-tunable optical filter control unit 109 to be shifted repeatedly by a large amplitude comparable to the band of the wavelength channel at the time of a reception error (e.g., in step S206 in FIG. 4).

Figure 6:
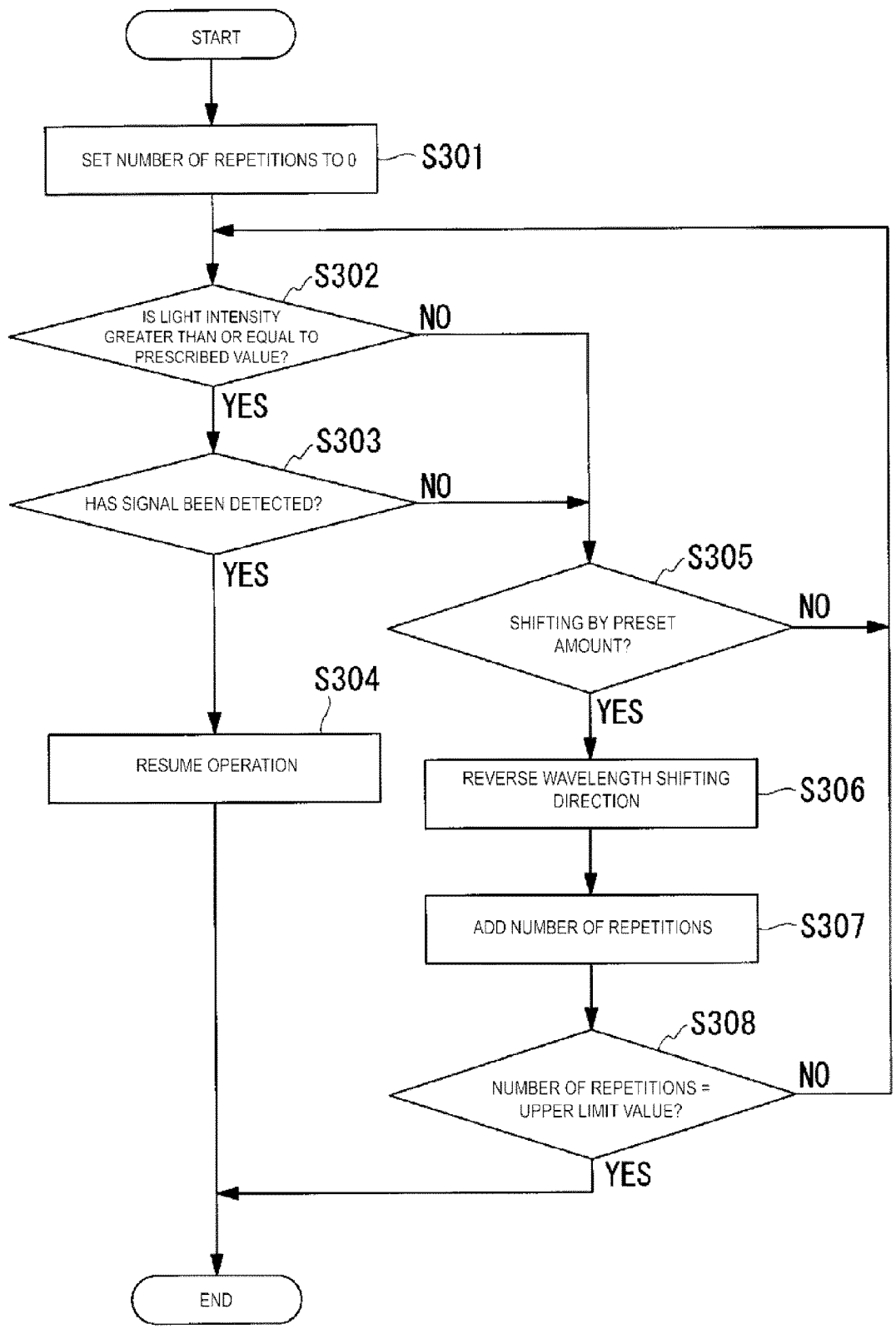
FIG. 6 is a flowchart illustrating a filter control process by the ONU according to a third embodiment.

FIG. 6 is a flowchart illustrating a filter control process by the ONU 10 according to the third embodiment. Note that the process illustrated in FIG. 6 is performed at the time of a reception error (e.g., in step S206 in FIG. 4).

First, the wavelength-tunable optical filter control unit 109 sets the number of repetitions to 0 (step S301). The wavelength-tunable optical filter control unit 109 performs control such that a wavelength of the wavelength-tunable optical filter 102 is caused to be shifted to either the short wavelength side or the long wavelength side. To which side between the short wavelength side and the long wavelength side shifting is to be made may be preset or may be specified externally. The magnitude and orientation of the wavelength shifting can be recognized and controlled as a change in a wavelength control parameter by the ONU 10. Note that the amount of shifting in one process may be preset. A method of controlling a micro shifting of the band of the filter wavelength may be a method of periodically controlling shifting, and the waveform may be, for example, sinusoidal or sawtooth with respect to time. Note that the wavelength-tunable optical filter control unit 109 measures the light intensity of the electrical signal obtained at the wavelength by shifting, after each shifting of the wavelength.

The wavelength-tunable optical filter control unit 109 determines whether the measured light intensity is greater than or equal to a prescribed value (step S302). If the light intensity is greater than or equal to the prescribed value (step S302: YES), whether a signal has been detected is determined (step S303). The determination of whether a signal has been detected is made based on a signal quality notification output from the signal quality determining unit 106a included in the electrical signal processing unit 106. For example, in a case in which the signal quality determination result included in the signal quality notification is "good," the wavelength-tunable optical filter control unit 109 determines that a signal has been detected. On the other hand, in a case that the signal quality determination result included in the signal quality notification is "poor," the wavelength-tunable optical filter control unit 109 determines that a signal has not been detected. If a signal is detected (step S303: YES), the ONU 10 starts an operation (step S304). Specifically, the ONU 10 performs the processes from step S110 illustrated in FIG. 2.

On the other hand, if the light intensity is not greater than or equal to the prescribed value (step S302: NO), or in a case in which a signal is not detected (step S303: NO), the wavelength-tunable optical filter control unit 109 determines whether a shifting has been made in a preset amount (step S305). If a shifting has not been made in the preset amount (step S305: NO), the wavelength-tunable optical filter control unit 109 continues the wavelength shifting of the band of the wavelength-tunable optical filter 102, and repeats the processes from step S302.

If a shifting has been made in the preset amount (step S305: YES), the wavelength-tunable optical filter control unit 109 controls the wavelength-tunable optical filter 102 such that the direction of the wavelength shifting is reversed (step S306). Thereafter, the wavelength-tunable optical filter control unit 109 adds the number of repetitions by one (step S307). The wavelength-tunable optical filter control unit 109 determines whether the number of repetitions has reached an upper limit (step S308).

If the number of repetitions reaches the upper limit (step S308: YES), the wavelength-tunable optical filter control unit 109 terminates the process of FIG. 6 assuming that the system cannot recover from the failure.

On the other hand, if the number of repetitions has not reached the upper limit value (step S308: NO), the wavelength-tunable optical filter control unit 109 continues the wavelength shifting of the band of the wavelength-tunable optical filter 102, and repeats the processes from step S302.

According to the ONU 10 of the third embodiment configured as described above, in a case in which the light intensity is smaller than a predetermined value, the wavelength shifting of the band of the wavelength-tunable optical filter 102 continues. In addition, in the case in which the band of the wavelength-tunable optical filter 102 is caused to be shifted by a magnitude that is considered comparable to the bandwidth of the wavelength channel, the ONU 10 according to the third embodiment reverses the direction of the wavelength shifting and performs the shifting until the light intensity reaches a predetermined value. In addition, the ONU 10 according to the third embodiment performs normal processing assuming that the system has recovered from the failure when the light intensity reaches a predetermined value or higher during the shifting. Thus, the ONU 10 according to the third embodiment can automatically detect and correct the wavelength discrepancy of the wavelength-tunable optical filter 102, thus can maintain optical communication, and further shifting of an optical filter wavelength can be performed and the system can recover even no optical signal is received due to the filter discrepancy. Thus, there is no need to send a technician to a user's home to replace the ONU 10 or replace the wavelength filter whenever a problem occurs in the ONU 10. As a result, a time required for recovery can be shortened.

In the method illustrated in FIG. 6, the wavelength-tunable optical filter 102 may shift the optical fiber wavelength to either of the adjacent wavelength channels $\lambda_{d1}$ and $\lambda_{d2}$, as illustrated in the dashed trapezoid in FIG. 5. At this time, whether the received optical signal is of a desired optical signal channel or is of an adjacent channel can be judged from the details of the received and decoded signal, commands exchanged between the OLT and the ONU performed out of the band, or the response or state notifications with respect to the commands. The ONU 10 can identify the relationship between the parameters for the wavelength-tunable optical filter 102 and the current wavelength channel to which the wavelength of the wavelength-tunable optical filter 102 belongs, and thus the parameters can be corrected as necessary. In other words, if a light intensity greater than or equal to a predetermined value is obtained and the quality of the received signal is satisfactory, the operation can be resumed because the wavelength discrepancy can be corrected based on the parameter of that time.

Modification Example

When recovery is not possible even if the number of repetitions of the wavelength shifting has reached the upper limit value in FIG. 6, it is assumed there is a failure and the wavelength control is set to be terminated. However, the control may be repeated continuously, that is, the upper limit value may be set to infinity.

Fourth Embodiment

The wavelength-tunable optical filter 102 is most likely to have a discrepancy when an optical access system is controlled to switch a channel, where there is a concern of unexpected overshooting or undershooting because a band of the wavelength-tunable optical filter 102 is greatly shifted by a magnitude large enough to span channels. Thus, in the present embodiment, in a case in which an operation is not resumed even after the wavelength shifting control of the filter as described in the third embodiment has been performed, control of switching back the wavelength channel and restoring to the state preceding the wavelength shifting control is performed. In other words, in the case in which an operation is not resumed even after the wavelength shifting control of the filter has been performed, the wavelength-tunable optical filter control unit 109 controls the wavelength-tunable optical filter 102 such that the filter returns to the state immediately before the channel switching operation is performed. Note that a configuration of the ONU 10 in the fourth embodiment is the same as that of the ONU 10 of the third embodiment, except some processes performed by the wavelength-tunable optical filter control unit 109. The difference will be mainly described below.

In the case in which an operation is not resumed even after the wavelength shifting control of the filter illustrated in FIG. 6 has been performed, the wavelength-tunable optical filter control unit 109 controls the wavelength-tunable optical filter 102 such that the filter returns to the state immediately before the wavelength channel is switched.

Figure 7:
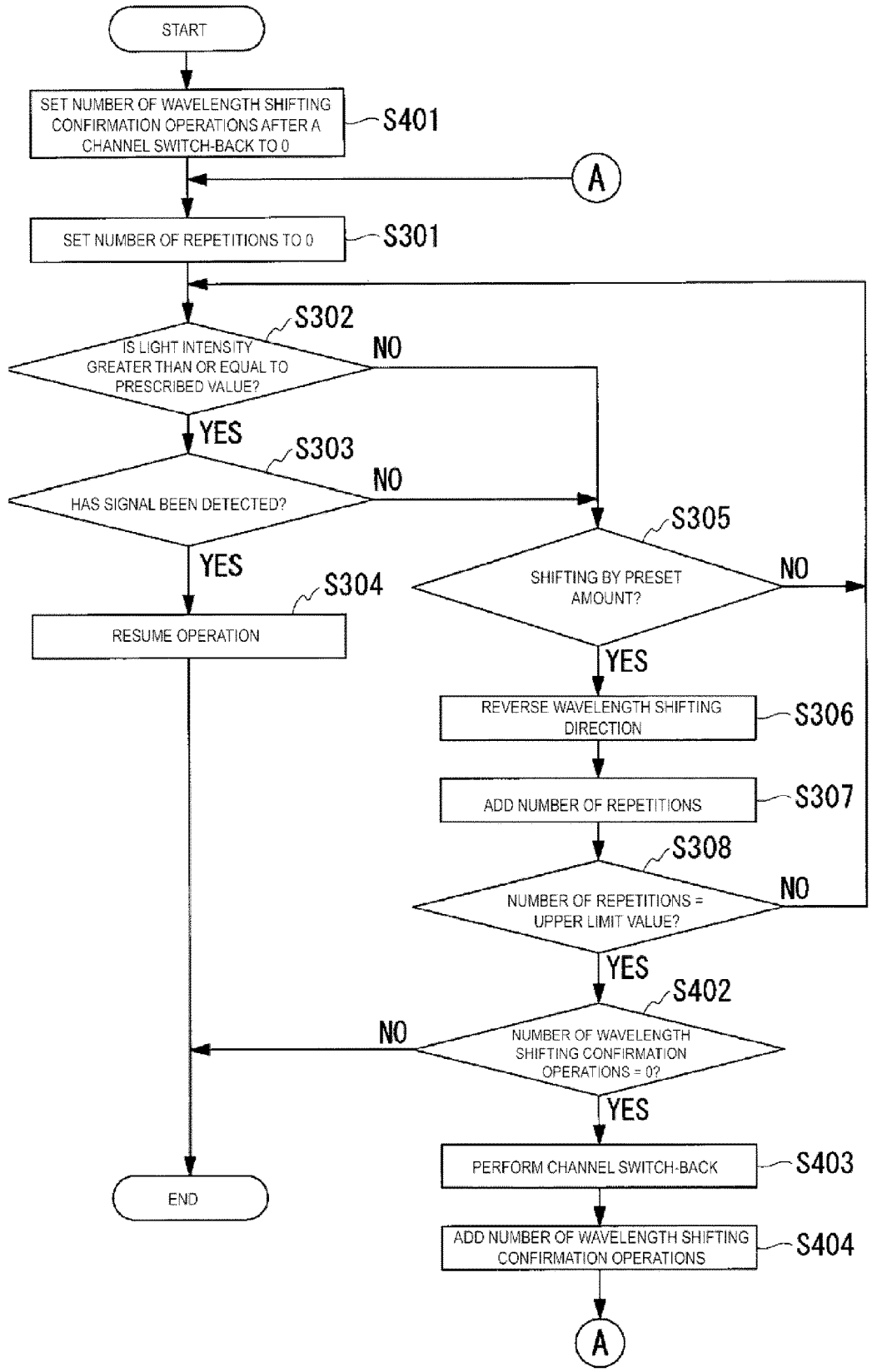
FIG. 7 is a flowchart illustrating a filter control process by the ONU according to a fourth embodiment.

FIG. 7 is a flowchart illustrating a filter control process by the ONU 10 according to the fourth embodiment. Note that the process illustrated in FIG. 7 is performed when it is not possible for the system to recover from the failure (e.g., in a case in which the answer to step S308 in FIG. 6 is YES). In addition, in FIG. 7, the same processes as those in FIG. 6 are given the same reference numerals as those in FIG. 6, and descriptions thereof will be omitted.

First, the wavelength-tunable optical filter control unit 109 sets the number of wavelength shifting confirmation operations after a channel switch-back to 0 (step S401). Here, the channel switch-back means restoring a wavelength channel of the wavelength-tunable optical filter 102 to a wavelength channel that is used the most recently.

In the process of step S308, the wavelength-tunable optical filter control unit 109 determines, when the number of repetitions reaches the upper limit value (step S308: YES), whether the number of wavelength shifting confirmation operations is 0 (step S402). If the number of wavelength shifting confirmation operations is not 0 (step S402: NO), the wavelength-tunable optical filter control unit 109 terminates the process of FIG. 7, assuming that the system cannot recover from the failure. Here, in the fourth embodiment, the switch-back is performed only once because there is concern that the wavelength discrepancy caused by the overshooting/undershooting may accumulate when switching or switch-back of the channel is repeated multiple times.

On the other hand, if the number of wavelength shifting confirmation operations is 0 (step S402: YES), the wavelength-tunable optical filter control unit 109 performs switch-back of wavelength channel (step S403). In this case, the wavelength-tunable optical filter control unit 109 performs control such that the wavelength of the wavelength-tunable optical filter 102 is caused to be shifted to either the short wavelength side or the long wavelength side within the switched-back wavelength channel band.

Thereafter, the wavelength-tunable optical filter control unit 109 adds the number of wavelength shifting confirmation operations (step S404).

According to the ONU 10 of the fourth embodiment configured as described above, when no optical signal is received and an operation is not resumed even after a received signal has been lost in the currently selected wavelength channel and the band of the wavelength-tunable optical filter 102 has been caused to be shifted to a degree suitable for the band of the wavelength channel, if the wavelength channel switching control has been performed most recently, failure due to the switching operation is assumed, and switching back to the wavelength channel that has been used most recently is performed. Then, the wavelength of the wavelength-tunable optical filter 102 is caused to be shifted to be within the switch-backed wavelength channel band to capture the received signal. As a result, it is possible to maintain optical communication by automatically detecting and correcting the wavelength discrepancy of the wavelength-tunable optical filter 102 and even when an optical signal is not received due to the filter discrepancy at the time of switching of the optical channel, the wavelength of the optical filter is shifted and switching back the wavelength channel is performed, and therefore recovery can be performed automatically. Thus, there is no need to send a technician to a user's home to replace the ONU 10 or replace the wavelength filter whenever a problem occurs in the ONU 10. As a result, a time required for recovery can be shortened.

Modification Example

When recovery is not possible even if the number of repetitions of the wavelength shifting has reached the upper limit value in FIG. 7, it is assumed there is a failure and the wavelength control is set to be terminated. However, the control may be repeated continuously, that is, the upper limit value may be set to infinity.

Fifth Embodiment

In the present embodiment, when the wavelength-tunable optical filter control unit 109 loses a received signal, the wavelength-tunable optical filter control unit 109 performs the transition of the wavelength of the wavelength-tunable optical filter 102 to be within the currently set wavelength channel as in the third embodiment, and when it is still not possible to capture the received signal, the wavelength-tunable optical filter control unit 109 performs control such that the wavelength of the wavelength-tunable optical filter 102 sequentially is caused to be shifted to another wavelength channel that can be used by the ONU 10 in the optical access system. Note that a configuration of the ONU 10 of the fifth embodiment is the same as that of the ONU 10 of the third embodiment, except some processes performed by the wavelength-tunable optical filter control unit 109. The difference will be mainly described below.

The wavelength-tunable optical filter control unit 109 performs the shifting of the wavelength of the wavelength-tunable optical filter 102 to be within the currently set wavelength channel, and when it is still not possible to capture the received signal, the wavelength-tunable optical filter control unit 109 performs control such that the wavelength of the wavelength-tunable optical filter 102 sequentially is caused to be shifted to another wavelength channel that can be used by the ONU 10 in the optical access system. In addition, the wavelength-tunable optical filter control unit 109 likewise causes the band of the wavelength-tunable optical filter 102 to be shifted to be within the wavelength channel as a shifting destination and detects the received signal.

Figure 8:
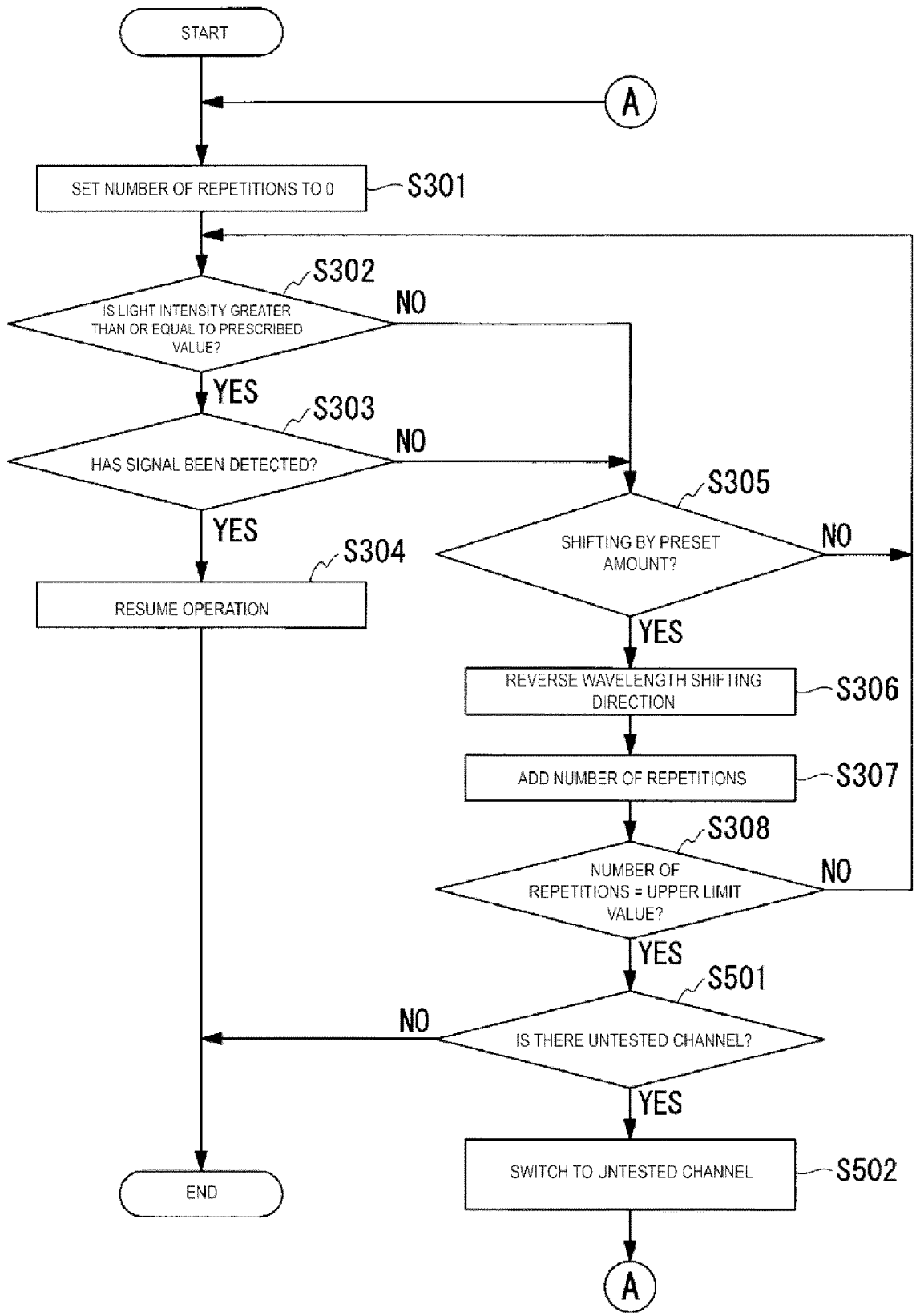
FIG. 8 is a flowchart illustrating a filter control process by the ONU according to a fifth embodiment.

FIG. 8 is a flowchart illustrating a filter control process by the ONU 10 according to the fifth embodiment. Note that the process illustrated in FIG. 8 is performed when it is not possible for the system to recover from the failure (e.g., in a case in which the answer to step S308 in FIG. 6 is YES). In addition, in FIG. 8, the same processes as those in FIG. 6 are given the same reference numerals as those in FIG. 6, and descriptions thereof will be omitted.

In the process of step S308, the wavelength-tunable optical filter control unit 109 determines, if the number of repetitions reaches the upper limit value (step S308: YES), whether there is an untested channel (step S501). If there is an untested channel (step S501: YES), the wavelength-tunable optical filter control unit 109 controls the wavelength-tunable optical filter 102 such that the wavelength channel of the wavelength-tunable optical filter 102 is switched to the untested wavelength channel (step S502). The untested wavelength channel may be selected randomly or sequentially.

On the other hand, if there is no untested channel (step S501: NO), the wavelength-tunable optical filter control unit 109 terminates the process of FIG. 8, assuming that it is not possible for the system to recover from the failure.

According to the ONU 10 in the fifth embodiment configured as described above, an optical signal is searched in all wavelength channels that are available to the ONU 10 and recovery is attempted, and thus, the availability of the optical access system can be increased.

Modification Example

With respect to the wavelength shifting of the wavelength-tunable filter between wavelength channels, when a received signal is not obtained even if shifting is made to all wavelength channels, wavelength control may be terminated assuming that failure has occurred or the wavelength shifting may be continuously repeated as illustrated in FIG. 8.

Sixth Embodiment

In the present embodiment, the wavelength-tunable optical filter control unit 109 provides an indicator for determining what process has been performed for recovery from a failure as wavelength control in the fifth embodiment, and acquires a value of the indicator. Then, a maintenance personnel at the telecommunications carrier base infers a location of the failure in the optical access system based on the acquired value of the indicator. Note that a configuration of the ONU 10 of the sixth embodiment is the same as that of the ONU 10 of the fifth embodiment, except some processes performed by the wavelength-tunable optical filter control unit 109. The difference will be mainly described below.

The wavelength-tunable optical filter control unit 109 has the indicator for a plurality of states and acquires a value of the indicator. The plurality of states include, for example, a state of a light intensity, a state of a signal, and a switching state of a wavelength channel.

Figure 9:
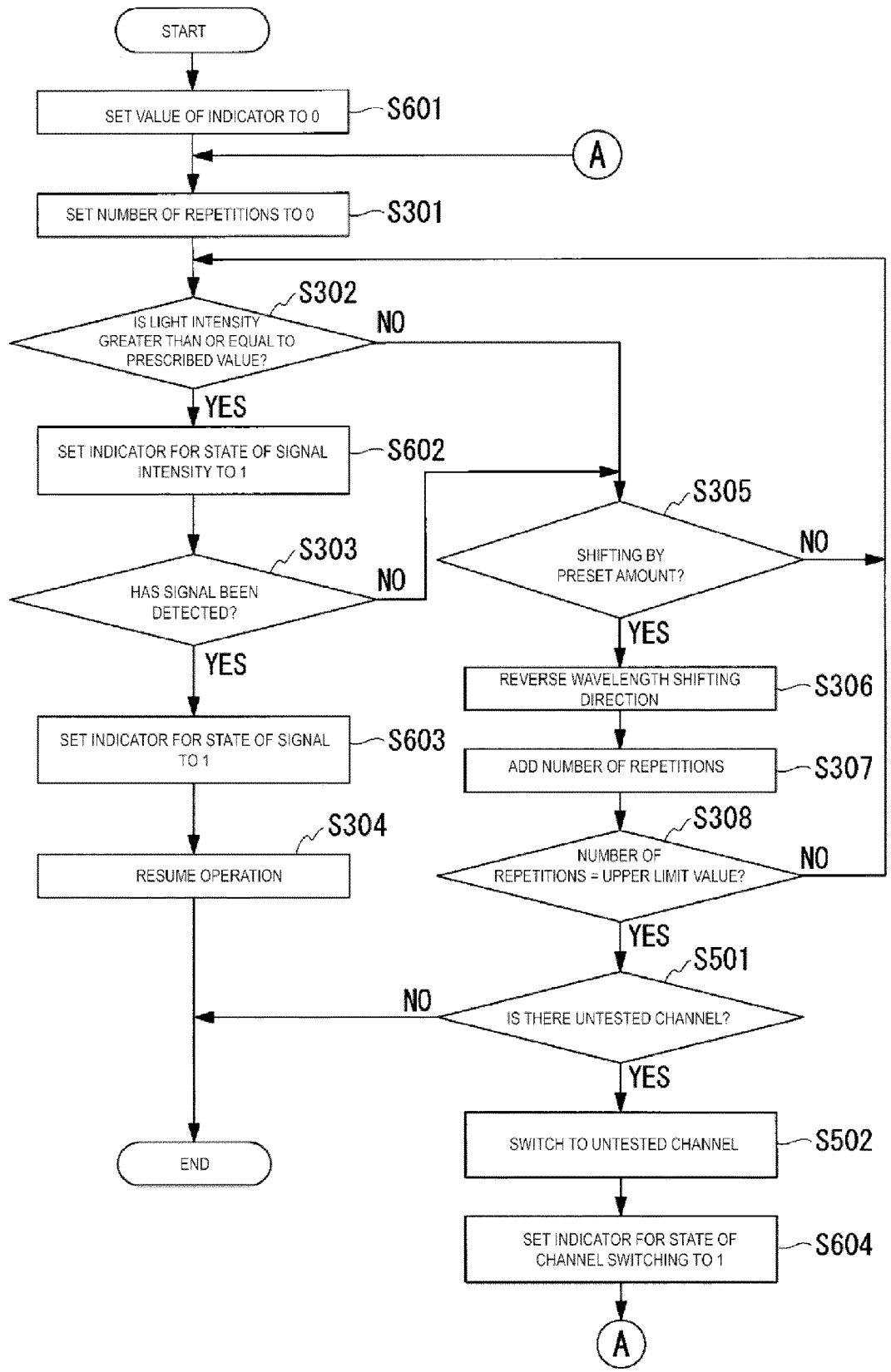
FIG. 9 is a flowchart illustrating a filter control process by the ONU according to a sixth embodiment.
Figure 11:
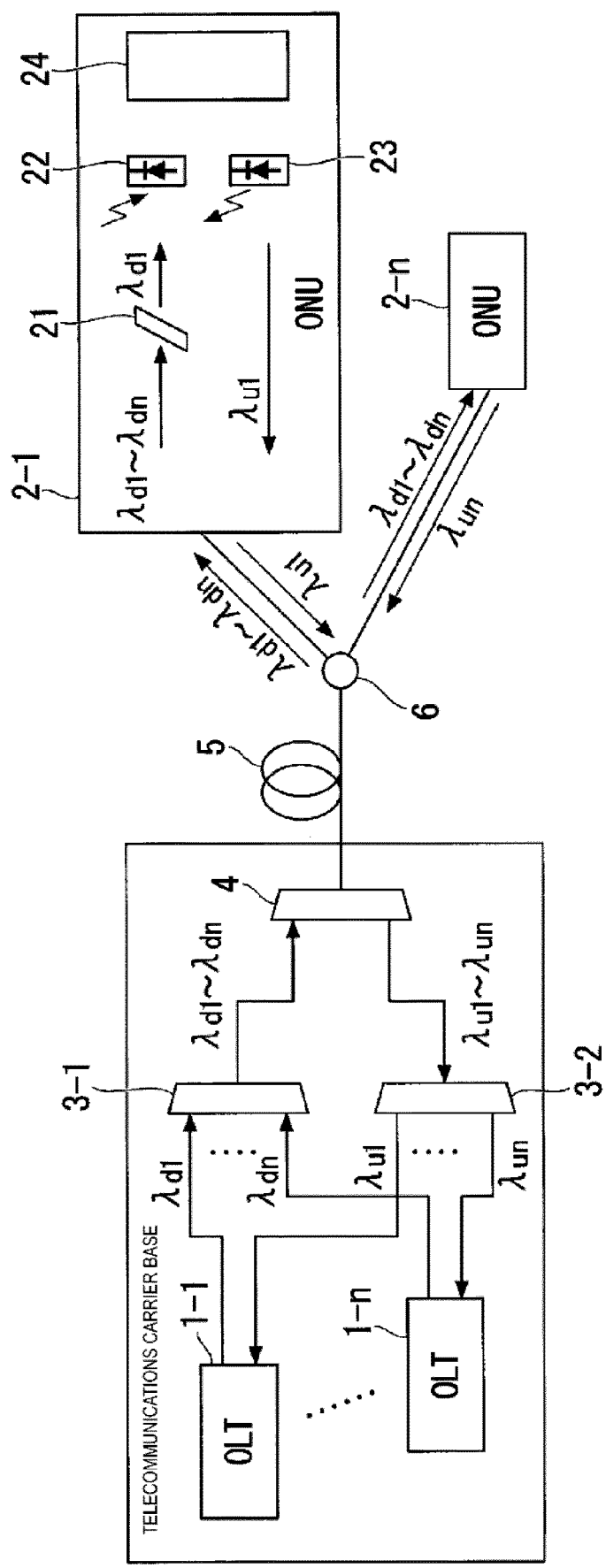
FIG. 11 is a diagram illustrating an example of an optical access system based on a WDM/TDM-PON.
Figure 12:
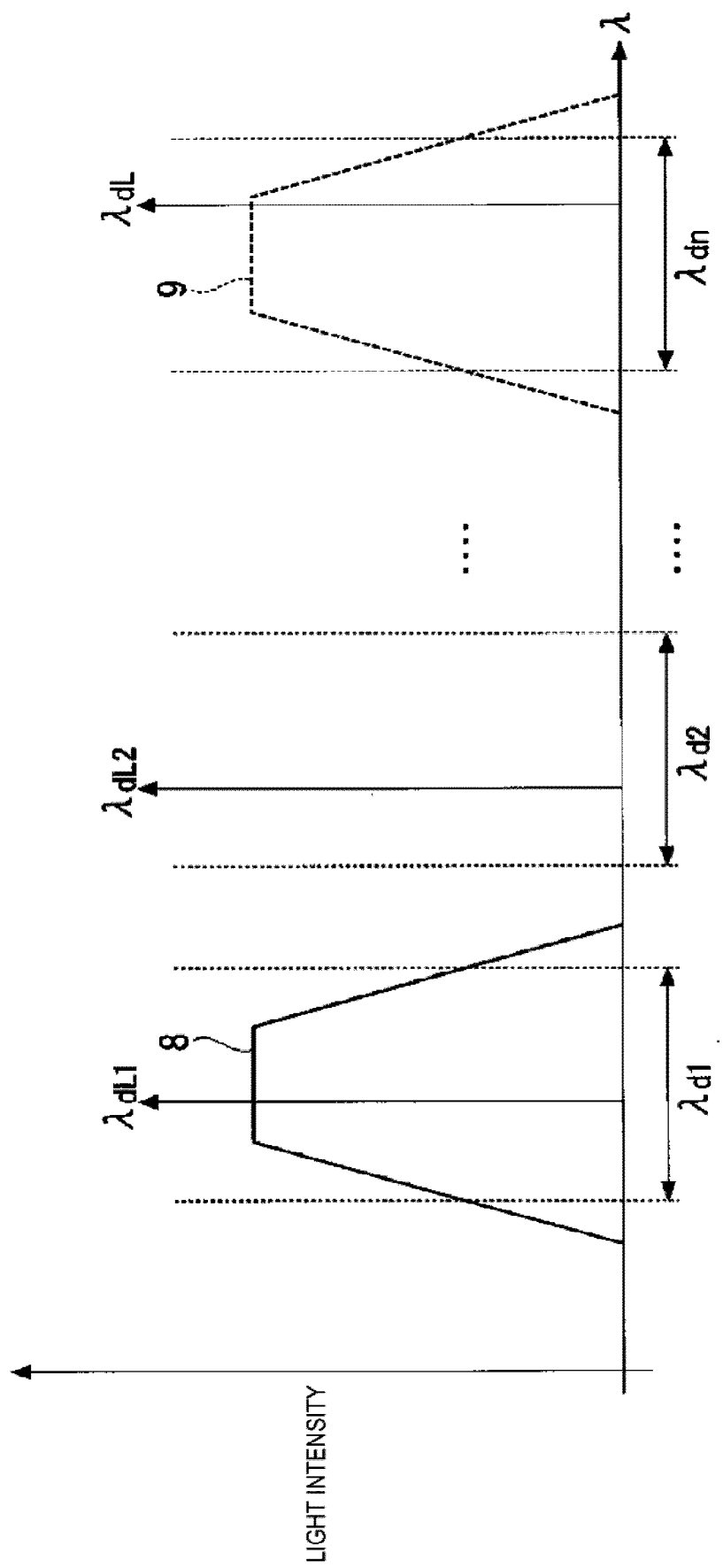
FIG. 12 is a diagram schematically illustrating a relationship between a received light wavelength, a received light wavelength channel, and a band of a wavelength-tunable optical filter in an ONU.

FIG. 9 is a flowchart illustrating a filter control process by the ONU 10 according to the sixth embodiment. Note that the process illustrated in FIG. 9 is performed when it is not possible for the system to recover from the failure (e.g., in a case in which the answer to step S308 in FIG. 6 is YES). In addition, in FIG. 9, the same processes as those in FIG. 8 are given the same reference numerals as those in FIG. 8, and descriptions thereof will be omitted.

First, the wavelength-tunable optical filter control unit 109 sets a value of the indicator for all states to 0 (step S601). In other words, the wavelength-tunable optical filter control unit 109 sets the value of the indicator for the state of a light intensity to 0, the value of the indicator for a state of a signal to 0, and the value of the indicator for a switching state of a wavelength channel to 0.

In the process of step S302, if the light intensity is equal to or greater than a prescribed value (step S302: YES), the wavelength-tunable optical filter control unit 109 sets the value of the indicator for the state of the light intensity to 1 (step S602). If a signal is detected in the process of step S303

(step S303: YES), the wavelength-tunable optical filter control unit 109 sets the indicator for the state of the signal to 1 (step S603).

In addition, after the process of step S502, the wavelength-tunable optical filter control unit 109 sets the value of the indicator for the switching state of the wavelength channel to 1 (step S604).

When the processes of the flowchart illustrated in FIG. 9 end, the wavelength-tunable optical filter control unit 109 acquires the values of the indicators for the state of the light intensity, the state of the signal, and the switching state, and stores each of the acquired values in the wavelength control parameter storing unit 108. Thus, the values of the indicators are recorded in the wavelength control parameter storing unit 108. In response to an output request for the values of the indicators, the wavelength-tunable optical filter control unit 109 acquires the values of the indicators for the state of the light intensity, the state of the signal, and the switching state stored in the wavelength control parameter storing unit 108, and externally outputs each of the acquired values. For example, the wavelength-tunable optical filter control unit 109 transmits each of the acquired values to an external apparatus. The maintenance personnel at the telecommunications carrier base infers the location of the failure in the optical access system as listed in the table of FIG. 10 based on the values of the indicators output from the ONU 10.

FIG. 10 is a diagram illustrating an example of a correspondence table used in inference of a location of a failure. OI in FIG. 10 is an indicator indicating whether a light intensity is greater than or equal to a prescribed value at the end of a flowchart, that is, an indicator for a state of a light intensity. The state OI=0 represents that a light intensity is below a prescribed value, and the state OI=1 represents that a light intensity is greater than or equal to the prescribed value.

MO in FIG. 10 is an indicator indicating the quality determination result of a received signal at the end of a flowchart, that is, an indicator for a state of the signal, where the state MO=0 represents that wavelength control has ended in a state of a poor signal quality, and the state MO=1 represents that wavelength control has ended in a state of a good signal quality.

CS in FIG. 10 is an indicator indicating whether a wavelength control has been performed through a channel shifting, that is, an indicator for a switching state of a wavelength channel, where the state CS=0 represents that wavelength control has ended without switching to another wavelength channel, and the state CS=1 represents that switching to another wavelength channel has been made to search for the received signal.

Note that the values of the indicators may be transmitted immediately as long as a signal can be transmitted to the OLT. However, in a case in which the ONU 10 cannot transmit a signal to the OLT due to any trouble, the values of the indicators may be recorded in the wavelength control parameter storing unit 108, and the ONU 10 may transmit the signal to the OLT at a timing at which communication is possible. Thus, the maintenance personnel at the telecommunications carrier base can obtain the values of the indicators.

If the indicators (OI, MO, CS) have values (1, 1, 0) respectively when the flowchart illustrated in FIG. 9 ends, a result of wavelength control is that the wavelength control has ended with the light intensity being greater than or equal to the prescribed value, a good signal quality, and without switching of the wavelength channel. In this case, a maintenance personnel at the telecommunications carrier base determines a wavelength discrepancy of the wavelength-tunable optical filter 102 as a presumed trouble because the recovery is successful without any recovery measure other than the wavelength control of the wavelength-tunable optical filter 102. In this case, because the system has recovered and no other failure is expected, it is concluded that further troubleshooting such as repair or investigation is unnecessary.

Similarly, if the indicators (OI, MO, CS) have values (1, 1, 1) respectively when the flowchart illustrated in FIG. 9 ends, a result of wavelength control is that the light intensity was greater than or equal to the prescribed value, the signal quality was good, and the wavelength channel has been switched. This indicates that there is a trouble in reception with the wavelength channel originally used, but the wavelength channel has been switched to capture the optical signal of another channel, and thus the operation has been resumed. In this case, as assumable failures, the wavelength-tunable optical filter control unit 109 determines a failure at the portion through which only the optical signal associated with the wavelength channel that has caused the trouble passes, for example, a transmission unit of the OLT using the wavelength channel, and a breakage of the section between the OLT and the secondary multiplexer/demultiplexer. Repair and investigation of that portion are performed for troubleshooting.

Similarly, if the indicators (OI, MO, CS) have values (1, 0, 0) respectively when the flowchart illustrated in FIG. 9 ends, they indicate that the signal quality was poor while an optical signal having a sufficient intensity was being received, recovery from the failure was not possible, and no shifting of the wavelength between channels was performed. In this case, as assumable failures, the maintenance personnel at the telecommunications carrier base determines that there is some trouble in receiving an optical signal and a trouble in controlling the wavelength-tunable optical filter 102 of the ONU 10 because the switching of the wavelength channel of the wavelength-tunable optical filter 102 was not performed as expected. In other words, issues other than the failure of the ONU 10 are unclear due to lack of information. For troubleshooting, first, replacement of the ONU 10 is considered.

Similarly, if the indicators (OI, MO, CS) have values (0, *, 1) respectively when the flowchart illustrated in FIG. 9 ends, where the symbol "*" may be either 0 or 1, they indicate that a sufficient light intensity was not obtained even after the wavelength channel was switched. In this case, the maintenance personnel at the telecommunications carrier base determines that there is a failure at the location through which the optical signal belonging to all wavelength channels passes as an assumable failure. That is, a wide section from the secondary multiplexer/demultiplexer to the ONU 10 is suspicious. For troubleshooting, the broken point of the section is searched to find a location that needs to be repaired. It is also conceivable a case in which, while the signal reaches the ONU 10 normally, the ONU 10 has difficulty recognizing the signal, and in this case, the ONU 10 needs to be replaced or repaired. There is also a situation in which all of the OLTs are out of order and no transmission has been performed on the entire wavelength channels, but it is stochastically unlikely.

According to the ONU 10 of the sixth embodiment configured as described above, the same effects as those of the ONU 10 of the fifth embodiment can be obtained. The ONU 10 of the sixth embodiment can acquire information available to infer a location of a failure from the result of control and externally output the acquired information. This enables the maintenance personnel at the telecommunications carrier base to infer a location of the failure. Accordingly, the availability of the system may be further increased.

Modification Example

When recovery is not possible even if the number of repetitions of the wavelength shifting has reached the upper limit value in FIG. 9, it is assumed there is a failure and the wavelength control is set to be terminated. However, the control may be repeated continuously, that is, the upper limit value may be set to infinity.

The embodiments of the present invention have been described above in detail with reference to the drawings. However, specific configurations are not limited to those embodiments, and include any design or the like within the scope not departing from the gist of the present invention.

REFERENCE SIGNS LIST

10 ONU
101 Optical signal input unit
102 Wavelength-tunable optical filter
103 Light receiving element
104 Signal amplifying unit
105 Signal waveform shaping unit
106 Electrical signal processing unit
106a Signal quality determining unit
106b Channel control processing unit
107 Signal output unit
108 Wavelength control parameter storing unit
109 Wavelength-tunable optical filter control unit

The invention claimed is:

1. A wavelength-tunable optical filter control apparatus in an optical access system that uses wavelength-multiplexed optical signal of a plurality of wavelength channels, the wavelength-tunable optical filter control apparatus comprising:
a wavelength-tunable optical filter configured to pass an optical signal of a specific wavelength channel among the plurality of wavelength channels;
a light receiving element configured to convert the optical signal that has passed through the wavelength-tunable optical filter into an electrical signal;
a signal quality determiner configured to determine a quality of the electrical signal; and
a wavelength-tunable optical filter controller configured to acquire a light intensity of the electrical signal, and control a wavelength of the wavelength-tunable optical filter based on the acquired light intensity and a determination result of the quality of the electrical signal,
wherein, in a case in which a predetermined condition is satisfied, the wavelength-tunable optical filter controller corrects a wavelength discrepancy of the wavelength-tunable optical filter based on a relationship between the light intensity and the wavelength of the wavelength-tunable optical filter, the wavelength being obtained by causing the wavelength of the wavelength-tunable optical filter to be shifted alternately in a shorter wavelength direction and a longer wavelength direction.

2. The wavelength-tunable optical filter control apparatus according to claim 1,
wherein, in a case in which an abnormality is detected in reception of the optical signal, the wavelength-tunable optical filter controller causes the wavelength of the wavelength-tunable optical filter to be shifted to another wavelength by a magnitude comparable to a band of the wavelength channel in use.

3. The wavelength-tunable optical filter control apparatus according to claim 2,
wherein, in a case in which an abnormality is detected in the reception of the optical signal after the wavelength of the wavelength-tunable optical filter has been shifted to the other wavelength by the magnitude comparable to the band of the wavelength channel in use, the wavelength-tunable optical filter controller switches the wavelength channel of the wavelength-tunable optical filter to a previous wavelength channel that is not shifted.

4. The wavelength-tunable optical filter control apparatus according to claim 2,
wherein, in a case in which an abnormality is detected in the reception of the optical signal after the wavelength of the wavelength-tunable optical filter has been shifted to the other wavelength by the magnitude comparable to the band of the wavelength channel in use, the wavelength-tunable optical filter controller switches the wavelength of the wavelength-tunable optical filter to all wavelength channels to control the wavelength of the wavelength-tunable optical filter.

5. The wavelength-tunable optical filter control apparatus according to claim 4,
wherein the wavelength-tunable optical filter controller externally outputs values, each of the values indicating states including a state of the light intensity after an end of the wavelength control of the wavelength-tunable optical filter, a state of the signal, and a switching state of the wavelength channel,
wherein the values are available for inferring a location of a failure in the optical access system.

6. A wavelength-tunable optical filter control method performed by a wavelength-tunable optical filter control apparatus in an optical access system that uses a wavelength-multiplexed optical signal of a plurality of wavelength channels, the wavelength-tunable optical filter control method comprising:
determining a quality of an electrical signal converted by a light receiving element configured to convert an optical signal that has passed through a wavelength-tunable optical filter configured to pass the optical signal of a specific wavelength channel among the plurality of wavelength channels into an electrical signal;
acquiring a light intensity of the electrical signal, and controlling to control a wavelength of the wavelength tunable optical filter based on the acquired light intensity and a determination result of the quality of the electrical signal; and
correcting, in a case in which a predetermined condition is satisfied, a wavelength discrepancy of the wavelength-tunable optical filter based on a relationship between the light intensity and the wavelength of the wavelength-tunable optical filter, the wavelength being obtained by causing the wavelength of the wavelength-tunable optical filter to be shifted alternately in a shorter wavelength direction and a longer wavelength direction.

7. The wavelength-tunable optical filter control method according to claim 6, further comprising:
causing, in a case in which an abnormality is detected in reception of the optical signal, the wavelength of the wavelength-tunable optical filter to be shifted to another wavelength by a magnitude comparable to a band of the wavelength channel in use.

8. The wavelength-tunable optical filter control method according to claim 7, further comprising:
switching, in a case in which an abnormality is detected in the reception of the optical signal after the wavelength of the wavelength-tunable optical filter has been shifted to the other wavelength by the magnitude comparable to the band of the wavelength channel in use, the wavelength channel of the wavelength-tunable optical filter to a previous wavelength channel that is not shifted.

9. The wavelength-tunable optical filter control method according to claim 7, further comprising:
switching, in a case in which an abnormality is detected in the reception of the optical signal after the wavelength of the wavelength-tunable optical filter has been shifted to the other wavelength by the magnitude comparable to the band of the wavelength channel in use, the wavelength of the wavelength-tunable optical filter to all wavelength channels to control the wavelength of the wavelength-tunable optical filter.

10. The wavelength-tunable optical filter control method according to claim 9, further comprising:
externally outputting values, each of the values indicating states including a state of the light intensity after an end of the wavelength control of the wavelength-tunable optical filter, a state of the signal, and a switching state of the wavelength channel,
wherein the values are available for inferring a location of a failure in the optical access system.

* * * * *